US012413814B2

(12) United States Patent
Liu et al.

(10) Patent No.: US 12,413,814 B2
(45) Date of Patent: Sep. 9, 2025

(54) SYSTEMS AND METHODS FOR GENERATING CONTROL PARAMETERS TO OPERATE SEXUAL STIMULATION DEVICE

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/809,159

(22) Filed: Aug. 19, 2024

(65) Prior Publication Data

US 2025/0008184 A1   Jan. 2, 2025

Related U.S. Application Data

(63) Continuation-in-part of application No. 17/221,823, filed on Apr. 4, 2021.

(51) Int. Cl.
*A61H 19/00* (2006.01)
*G05B 19/042* (2006.01)
*H04N 21/45* (2011.01)

(52) U.S. Cl.
CPC ............ *H04N 21/45* (2013.01); *A61H 19/00* (2013.01); *G05B 19/0423* (2013.01)

(58) Field of Classification Search
CPC .................................................. A61H 19/00
See application file for complete search history.

(56) References Cited

U.S. PATENT DOCUMENTS

| | | | |
|---|---|---|---|
| 11,938,078 B2 | 3/2024 | Liu | |
| 12,167,988 B2 * | 12/2024 | Kuncewicz | A61H 19/00 |
| 2016/0030279 A1 * | 2/2016 | Driscoll | A61H 19/40 601/46 |
| 2016/0175186 A1 * | 6/2016 | Shadduck | A61H 19/34 601/15 |
| 2017/0319430 A1 * | 11/2017 | Shadduck | G05G 9/04 |
| 2018/0140502 A1 * | 5/2018 | Shahoian | A61H 19/44 |
| 2020/0147808 A1 * | 5/2020 | Pirzchalski | B25J 11/0005 |
| 2021/0177691 A1 * | 6/2021 | Shahoian | H04W 12/0433 |
| 2023/0252775 A1 * | 8/2023 | Lee | A61B 5/11 382/103 |
| 2024/0024190 A1 * | 1/2024 | Kuncewicz | G06V 20/44 |

(Continued)

*Primary Examiner* — LaToya M Louis
(74) *Attorney, Agent, or Firm* — Holtz, Holtz & Volek PC

(57) ABSTRACT

The present invention relates to systems and methods for generating control parameters to operate a sexual stimulation device. The system includes a memory storing executable instructions and a processor operatively coupled with the memory. The processor executes the executable instructions to cause the system to obtain input including personalized interaction data from a user terminal associated with a user. The processor generates a control response corresponding to the input based on implementing generative artificial intelligence models. The control response includes a set of control parameters and an auxiliary response appended with coded data representing the set of control parameters defined for operating the sexual stimulation device. The processor transmits the control response to the user and other users for operating the sexual stimulation device associated with the user and the other users to provide sexual stimulation to the user and the other users corresponding to the input.

17 Claims, 8 Drawing Sheets

(56) References Cited

U.S. PATENT DOCUMENTS

2024/0091097 A1    3/2024  Liu
2024/0197559 A1    6/2024  Liu
2024/0307256 A1*  9/2024  Kuncewicz ............ A61H 19/00

* cited by examiner

SYSTEMS AND METHODS FOR GENERATING CONTROL PARAMETERS TO OPERATE SEXUAL STIMULATION DEVICE

TECHNICAL FIELD

The present invention relates generally to electronic-based adult entertainment systems and methods, and more particularly relates to systems and methods for generating control parameters to operate a sexual stimulation device for providing sexual pleasure to users.

BACKGROUND

Sexual stimulation can be achieved by an individual or a group of individuals (irrespective of gender) by using various means. Conventionally, self-operated sex toys are used by an individual for experiencing sexual stimulation. Further, the conventional sex toys are equipped with a motion generating mechanism for creating a vibrating motion to provide sexual pleasure. However, the conventional sex toys may not provide the same level of sexual pleasure at every instance due to limited controllable settings in the adult toys. Additionally, the arousals of the individual may change periodically based on mood and environment, thus the sexual pleasure produced by the conventional sex toys may not satisfy the individual.

Currently, social media and the ability to extend wireless interfaces, local and wide area networking, etc., have contributed to new methods and systems for experiencing sexual stimulation. In one example scenario, the individual may be allowed to experience enhanced sexual stimulation while viewing the sexual content. Additionally, the sex toys are operated to mimic the actions performed in the sexual content. However, in most cases, the sex toys may not be synchronized with the sexual content, thus resulting in an unsatisfied sexual experience while operating the sex toys.

Due to advent in technology, a level of customization may be achieved by the individual or group of individuals for experiencing the sexual pleasure with the sex toys. Further, these technologies require built-in sensors configured in the sex toys for determining parameters related to sexual behavior, mood, and arousal, and so forth for operating the sex toys. However, in some cases, the sensors may not appropriately determine the parameters, thus leading to failure in providing desired sexual stimulus or arousal associated with masturbation.

Therefore, there is a need for systems and methods for generating control parameters for operating sexual stimulation device and providing interactive adult entertainment to users that overcome the aforementioned deficiencies along with providing other advantages.

SUMMARY

Various embodiments of the present disclosure disclose systems and methods for generating control parameters to operate a sexual stimulation device for providing sexual pleasure to users.

In an embodiment, a system is disclosed. The system includes a memory storing executable instructions and a processor operatively coupled with the memory. The processor is configured to execute the executable instructions to cause the system to obtain input including at least one personalized interaction data from at least one user terminal associated with at least one user. Further, the processor is configured to generate a control response through one or more generative artificial intelligence (AI) models based at least on the input. The one or more generative artificial intelligence (AI) models are at least configured to generate the control response at least driven or constrained by the input. In one scenario, the control response includes a set of control parameters determined for operating at least one sexual stimulation device associated with the at least one user or at least one sexual stimulation device associated with other users interacting with the at least one user. In another scenario, the control response includes an auxiliary response appended with coded data representing the set of control parameters defined for operating the at least one sexual stimulation device associated with the at least one user or the at least one sexual stimulation device associated with the other users. Furthermore, the processor is configured to transmit the control response to the at least one sexual stimulation device of the at least one user or the at least one sexual stimulation device of the other users for at least operating the at least one sexual stimulation device associated with the at least one user or the at least one sexual stimulation device associated with the other users to provide sexual stimulation to the at least one user or the other users corresponding to the input.

In another embodiment, a computer-implemented method is disclosed. The computer-implemented method performed by a processor includes obtaining input including at least one personalized interaction data from at least one user terminal associated with at least one user. Further, the method includes generating a control response through one or more generative artificial intelligence (AI) models based at least on the input. The one or more generative artificial intelligence (AI) models are at least configured to generate the control response at least driven or constrained by the input. The control response includes a set of control parameters determined for operating at least one sexual stimulation device associated with the at least one user or at least one sexual stimulation device associated with other users interacting with the at least one user. Further, the control response includes an auxiliary response appended with coded data representing the set of control parameters defined for operating the at least one sexual stimulation device associated with the at least one user or the at least one sexual stimulation device associated with the other users. Furthermore, the method includes transmitting the control response to the at least one sexual stimulation device of the at least one user or the at least one sexual stimulation device of the other users for at least operating the at least one sexual stimulation device associated with the at least one user or the at least one sexual stimulation device associated with the other users to provide sexual stimulation to the at least one user or the other users corresponding to the input.

In yet another embodiment, a non-transitory computer-readable storage medium is disclosed. The non-transitory computer-readable storage medium includes machine-readable instructions. The machine-readable instructions when executed by a processor of a system enable the system to obtain input including at least one personalized interaction data from at least one user terminal associated with at least one user. Further, the processor is configured to generate a control response through one or more generative artificial intelligence (AI) models based at least on the input. The one or more generative artificial intelligence (AI) models are at least configured to generate the control response at least driven or constrained by the input. The control response includes a set of control parameters determined for operating at least one sexual stimulation device associated with the at least one user or at least one sexual stimulation device associated with other users interacting with the at least one user. Further, the control response includes an auxiliary response appended with coded data representing the set of control parameters defined for operating the at least one sexual stimulation device associated with the at least one user or the at least one sexual stimulation device associated with the other users. Furthermore, the processor is configured to transmit the control response to the at least one sexual stimulation device of the at least one user or the at least one sexual stimulation device of the other users for at least operating the at least one sexual stimulation device associated with the at least one user or the at least one sexual stimulation device associated with the other users to provide sexual stimulation to the at least one user or the other users corresponding to the input.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present invention are described hereinafter with reference to FIG. 1 to FIG. 6.

Figure 1:
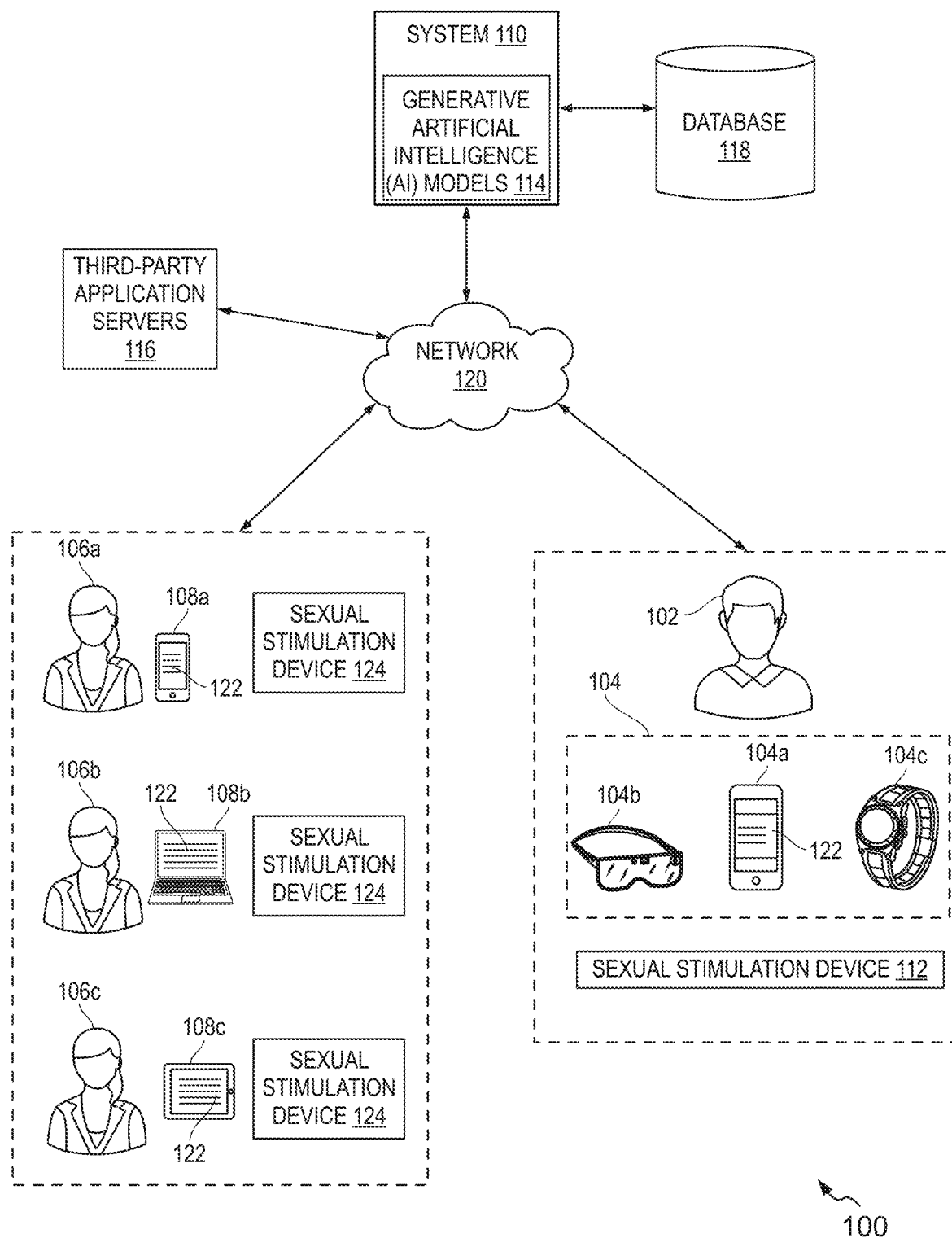
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes at least one user terminal 104 associated with at least one user 102. As shown, the at least one user terminal 104 associated with the at least one user 102 includes a user terminal 104a (exemplarily depicted to be a smart phone), a wearable headset 104b (e.g., augmented reality (AR)/virtual reality (VR) headset), a wearable device 104c (e.g., smartwatch). Additionally, or alternatively, the at least one user terminal 104 may include other devices such as a desktop, a laptop, a tablet, and the like. Further, the at least one user 102 includes at least one sexual stimulation device 112. For example, the sexual stimulation device 112 is a male sexual stimulation device. The sexual stimulation device 112 may be connected wirelessly with the at least one user terminal 104. Some examples of the wireless connectivity for enabling connection between the sexual stimulation device 112 and the at least one user terminal 104 may be, but are not limited to, near field communication (NFC), wireless fidelity (Wi-Fi), Bluetooth, and the like.

Furthermore, the environment 100 may include other users such as a user 106a, a user 106b, and a user 106c. The other users 106a, 106b, and 106c include a user device 108a, a user device 108b, and a user device 108c, respectively. Some examples of the user devices 108a-108c may include, but are not limited to, laptops, smartphones, desktops, tablets, workstation terminals, an Ultra-Mobile personal computer (UMPC), a phablet computer, a handheld personal computer, and the like. Further, each of the other users 106a-106c may include at least one sexual stimulation device (see, 124). For example, the sexual stimulation device 124 may be a female sex toy such as a dildo, vibrator, clit sucking device, and the like. The sexual stimulation device 124 may be connected wirelessly with the corresponding user devices 108a-108c. Some examples of the wireless connectivity for enabling connection between the sexual stimulation device 124 and the user devices 108a-108c may be, but are not limited to, near field communication (NFC), wireless fidelity (Wi-Fi), Bluetooth, and the like. Furthermore, the environment 100 is depicted to include a system 110, third-party application servers 116, and a database 118 associated with the system 110.

Various entities in the environment 100 may connect to a network 120 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 120 may include a secure protocol (e.g., Hypertext Transfer Protocol (HTTP)), and/or any other protocol, or set of protocols. In an example embodiment, the network 120 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

In one embodiment, the system 110 may be embodied in at least one computing device (e.g., the user terminal 104 and the user devices 108a-108c). The system 110 embodied in the computing devices may be configured to perform one or more operations described herein. In another embodiment, the system 110 may be an individual entity of the environment 100 and is communicably coupled with the other entities of FIG. 1 via the network 120. In another embodiment, the system 110 may be implemented as a server system and communicably coupled to the user terminal 104 and the user devices 108a-108c via the network 120.

In an embodiment, the at least one user terminal 104 (e.g., the user device 104a) and the user devices 108a-108c may be equipped with an instance of an application 122. The application 122 may be hosted and managed by the system 110, for operating at least the sexual stimulation device 112 of the at least one user 102 (hereinafter interchangeably referred to as 'the user 102') and enabling communication between the user 102 and the other users 106-106c, and the like. In an embodiment, the system 110 may provide the application 122, in response to a request from the user terminal 104 and the user devices 108a-108c via the network 120. In another embodiment, the application 122 may be factory-installed on the user terminal 104 and the user devices 108a-108c. In another embodiment, the user device such as the user device 104a and the user devices 108a-108c may access an instance of the application 122 from the system 110 for installation on the user device 104a and the user devices 108a-108c using application stores associated with operating systems such as Apple iOS®, Android™ OS, Google Chrome OS, Symbian OS®, Windows Mobile® OS, and the like.

The system 110 is embodied in at least one computing device in communication with the network 120. The system 110 may be specifically configured, via executable instructions to perform one or more of the operations described herein. In general, the system 110 is configured to determine control parameters and provide adult entertainment to the user 102 based on at least one personalized interaction data of an input associated with the user 102. The system 110 further includes one or more generative artificial intelligence (AI) models 114. In an embodiment, the generative AI models 114 may be embodied within the system 110. In another embodiment, the generative AI models 114 may be embodied in the at least one user terminal 104 and may be communicably coupled to the system 110. In some embodiments, the generative AI models 114 may be embodied in the sexual stimulation device 112 and may be communicably coupled to the system 110. In some embodiments, the generative AI models 114 may be configured in the at least one user terminal 104 and the system 110. In this scenario, the generative AI models 114 are configured to process data in parallel on each computing node of these computing devices (i.e., the user terminal 104 and the system 110) to improve efficiency and processing speed. The generative AI models 114 may include general class models or specialized class models that are trained specifically to generate control parameters and related content for the sexual stimulation device 112 which will be explained further in detail.

Further, the third-party application servers 116 may be communicably coupled with the system 110. The third-party application servers 116 may be configured to provide access to third-party applications to the user 102 and the other users 106a-106c. The third-party applications may provide services related to live broadcast or live streaming, rendering adult content, and the like which will be explained further in detail.

In an embodiment, the system 110 is configured to obtain the input including the at least one personalized interaction data (hereinafter interchangeably referred to as 'the personalized interaction data') from the at least one user terminal 104 associated with the at least one user 102. The personalized interaction data is obtained based at least on a set of actions associated with the user 102 while using at least the sexual stimulation device 112, user input data, and user interaction with content. In other words, the set of actions may include data generated in the usage scenario of the sexual stimulation device 112, data generated in user sexual interaction scenarios, user personal information, data transmission between the user 102 and the other users (e.g., the user 106a), and the like. Thereafter, the system 110 is configured to generate a set of feature vectors corresponding to the input including the at least one personalized interaction data based at least on extracting a set of attributes from the input including the at least one personalized interaction data. The system 110 generates a control response based at least on the set of feature vectors corresponding to the input including the at least one personalized interaction data. The control response is generated based at least on the generative artificial intelligence (AI) models 112. In one scenario, the control response may include a set of control parameters determined for operating the sexual stimulation devices 112 and 124. In another scenario, the control response may include a control instruction appended with the set of control parameters defined for operating the sexual stimulation devices 112 and 124. In another scenario, the control response may include an auxiliary response appended with coded data (e.g., numbers or alpha-numeric code or a control graph) representing the set of control parameters defined for operating the sexual stimulation devices 112 and 124.

Further, unlike general generative AI models that can only be used to generate text or images, the generative AI model of an embodiment is at least configured to generate the control response at least driven or constrained by the input. The control response is at least configured to operate at least one sexual stimulation device 112 associated with the at least one user 102 and/or the sexual stimulation device 124 of the other users 106a-106c interacting with the at least one user 102. It is to be noted that the one or more generative artificial intelligence (AI) models 114 generate the control response at least driven or constrained by the input. This means that the generative AI models 114 receives the input and, driven or constrained by the input, the generative AI models 114 generate the control response that is at least partially related to the control of the sexual stimulation device (i.e., the sexual stimulation devices 112 and 124), thereby controlling the sexual stimulation device to perform sexual stimulation operation on the respective user (i.e., the user 102 and the other users 106a-106c). The stimulation operation may include at least adjusting the modes of the sexual stimulation device, intensities, or other parameters, which allows the sexual stimulation device (e.g., the sexual stimulation device 112) to provide the user 102 with a more personalized sexual entertainment experience. The generative AI models 114 may be trained based on deep learning architectures such as variant self-encoders (e.g., variational self-encoders VAE), generative adversarial networks (GANs), or structures such as Transformer. Further, the generative AI models 114 may learn the underlying distributions and patterns of data samples of control responses or other relevant data samples during training and are able to generate control responses that are similar to the training data.

Among other things, the input contains personalized interaction data that can act as a driver to guide or influence the generation of the control response by the generative AI models 114. In this case, the personalized interaction data contained in the input directly or indirectly determines or influences the direction, nature, and specific content of the control response generated by the generative AI models 114 (e.g., the pattern or style of the control pattern for the controlling sexual stimulation devices 112 and 124, etc.). Hence, the control response is generated similar in personalized style to the personalized interaction data, to match the sexual entertainment needs implicit in the personalized interaction data. For example, the personalized interaction data includes a sample control pattern selected by the user 102. The sample control pattern may include personalized information such as the user's 102 preferred stimulation pattern, intensity, duration, and frequency. This personalized interaction data can be passed as input to the generative AI models 114. For example, the user 102 may prefer a 'slow rise to climax' control pattern, which may be expressed as a gradual increase in intensity from a low intensity at the beginning to a high intensity. The generative AI models 114 will be guided or influenced by these preferred control modes to generate appropriate control responses, such as adjusting the vibration pattern of the sexual stimulation device from gentle to intense, to mimic the user's 102 preferred or customary sexual stimulation experience.

Alternatively, the input contained personalized interaction data may act as a constraint to limit or influence the generation of the control response by the generative AI models 114. In this case, the input-contained personalized interaction data not only guides the direction and nature of the generation of the control response by the generative AI models 114, but also sets the boundaries or conditions for the generation of the control response by the generative AI models 114. In this scenario, the generative AI models 114, even though it has a certain degree of freedom in the process of generating the control response, still needs to comply with the control response based on the restrictive rules implicitly or explicitly imposed by the inputs. For example, it may be possible for the control parameters output by the generative AI models 114 for use with the controlled sexual stimulation device to not exceed a safe or comfortable range to avoid causing harm to the user 102. In this exemplary scenario, specifically, the system 110 may consider factors such as safety and comfort in addition to the user's 102 preference data. For example, even though the user prefers higher intensity stimulation, the system 110 may have set a maximum intensity threshold based on the user's 102 cues (e.g., the user's cue to enter 'control needs to be safe') in order to ensure safety and to avoid causing harm to the user 102.

In addition, the system 110 may dynamically adjust the intensity based on the user's 102 physiological response data (e.g., heart rate, skin conductivity, etc.) to ensure that the user's comfort range is not exceeded. In this case, personalised interaction data can set boundaries for generating control responses, such as maximum intensity thresholds, minimum intensity thresholds, permissible rates of change, etc., which can keep the control response of the sexual stimulation device within a safe and comfortable range.

The system 110 transmits the control response to the at least one user terminal 104 of the user 102. The control response appended with the set of control parameters operates the sexual stimulation device 112 and 124 to provide sexual stimulation to the user 102 and the other users 106a-106c corresponding to the input including the at least one personalized interaction data. In addition, the control response may include at least text content, image content, video content, and audio content applicable to the operation of the sexual stimulation device 112. The control response is appended with at least the text content, the image content, the video content, and the audio content based at least on the personalized interaction data. The control parameters, text content, image content, video content, and audio content appended in the control response may be stored in the database 118 associated with the system 110.

In one scenario, the input may include a single personalized interaction data. For example, the single personalized interaction data may include either the data generated in the usage scenario of the sexual stimulation device 112, the data generated in the sexual interaction scenarios, the personal information, the data transmission between the user 102 and the other users (e.g., the user 106a), or the like. The data obtained during the use of the sexual stimulation device 112 and/or the user interaction with the content (i.e. the sexual interaction) may include at least a voice input, a text input, a gesture input, facial expressions, and the like. Upon receipt of the input (or the single personalized interaction data), the system 110 may be configured to generate a first set of feature vectors corresponding to the input including the single personalized interaction data. In particular, the generative AI models 114 extract the set of attributes from the input including the single personalized interaction data. Further, the system 110 generates a vector matrix including the first set of feature vectors corresponding to the input including the at least one personalized interaction data (or the single personalized interaction data). In one scenario, the generative AI models 114 output the control parameters for operating the sexual stimulation device 112 based on the first set of feature vectors corresponding to the input including the single personalized interaction data. In another scenario, the generative AI models 114 may output at least text content, image content, video content, and audio content applicable to the operation of the sexual stimulation device 112. Thereafter, the generative AI models 114 creates the control response by appending the above-mentioned output in both scenarios. The one or more generative AI models 114 may use the first set of feature vectors extracted from the personalized interaction data to generate the control response, and the first set of feature vectors may be used as a guide for generating the control response, or may be used as a constraint in the generating process, influencing the one or more generative AI models 114 to generate the control response that matches the user's 102 inputs, conforms to the user's 102 preferences, or conforms to a safety standard. For example, the personalized interaction data may include a user-preferred control pattern, from which the system 110 extracts a feature vector, such as the intensity of the stimulus, the rate of change, and so on, preferred by the user. This feature vector may be used to guide the generative AI models 114 to generate the control response that meets the user's 102 preferences, or it may be used to ensure that the generated control response does not exceed a safe range, such as by setting a maximum intensity threshold to avoid harming the user 102. In this way, the generative AI models 114 is able to find a balance between personalization and safety, satisfying the user's preferences while ensuring safety and comfort.

In an embodiment, the process of processing personalized interaction data and generating the control response may involve the following specific processing:

(1) Data Input and Preprocessing: the system 110 receives the input containing the single personalized interaction data. This personalized interaction data may include text messages, voice recordings, images, or any other data that reflects the user's personalized characteristics or matches the user's personal preference. Before feeding the personalized interaction data into the generative AI model 114, a series of preprocessing steps are required to ensure the quality and consistency of the single personalized interaction data. The preprocessing steps may include data cleansing (removing noise, and invalid data), data transformation (e.g., text segmentation, audio feature extraction), data normalization or standardization, etc.

(2) Feature extraction: the system 110 identifies and extracts key attributes from the input. These attributes may include the user's identity, historical behavioral records, emotional tendencies, contextual environment, etc. The selection of these attributes could be based on task requirements and data characteristics. Based on the extracted attributes, the system 110 generates one or more feature vectors. A feature vector is a high-dimensional representation of the original data that captures the essential characteristics of the personalized interaction data. Various techniques can be used in generating feature vectors, such as word embedding (for text data), hidden states of convolutional neural networks (CNN), recurrent neural networks (RNN) (for image or sequence data), etc.

(3) Generative AI model application: configure a suitable generative AI model (such as the generative AI models 114) based on the task requirements. The generative AI models 114 may include, but are not limited to, Variable Autoencoder (VAE), Generative Adversarial Network (GAN), Transformer-based models (e.g., GPT series), etc. The above-mentioned generative AI models may include powerful generative capabilities to generate new data or responses based on input feature vectors. Among other things, the generative AI models 114 may be allowed to be adequately trained before the feature vectors are fed into the generative AI models 114. The training process typically involves using a large amount of labeled data to optimize the model's parameters so that it can accurately capture the distribution and patterns of the data.

(4) Control Response Generation: the first set of feature vectors is passed as input to the generative AI models 114. The generative AI models 114 generate the control responses based on the feature vectors.

In another scenario, the input may include at least two personalized interaction data. The at least two personalized interaction data are simultaneously obtained based on the set of actions associated with the user 102 while using at least the sexual stimulation device 112, the user input data, and the user interaction with the content. For example, the at least two personalized interaction data may include user voice commands and facial expressions, environmental sounds and text descriptions, etc. Thereafter, the system 110 generates a second set of feature vectors corresponding to the at least two personalized interaction data. The second set of feature vectors (i.e. multimodal features) is generated based at least on extracting the set of attributes from each input type of the at least two personalized interaction data. Further, the system 110 generates a fused feature vector based at least on merging the second set of feature vectors of each personalized interaction data of the at least two personalized interaction data by implementing at least one neural network. Some examples of the neural network may include, but not limited to, Multi-scale convolutional neural networks (MS-CNNs), Multi-scale Graph Neural Networks (MSGNNs), Attention-based Fusion Networks, Concatenation based Fusion, Weighted Fusion Networks, Multi-Task Learning Networks, Modal Interaction Networks, etc. In other words, the extracted multimodal features (or the second set of features of each input type) are fused, such as through attention mechanisms, deep neural networks, and other methods, to generate the fused feature vector. The fused feature vector contains the comprehensive impact of each modal data (or the second set of features of each input type) to guide the generation of the set of control parameters. Thereafter, the generative AI models 114 generate the control response based at least on the fused feature vector corresponding to the input including the at least two personalized interaction data. In one scenario, the control response facilitates the operation of the sexual stimulation devices 112 and 124 to provide sexual stimulation to the at least one user 102 and the other users 106a-106c corresponding to the input. In another scenario, the control response may output at least text content, image content, video content, and audio content applicable to the operation of the sexual stimulation device 112. The one or more generative AI models 114 may use the second set of feature vectors extracted from the at least two personalized interaction data to generate the control response. The second set of feature vectors may be used as a guide for generating the control response, or may be used as a constraint in the generating process, influencing the one or more generative AI models 114 to generate a control response that matches the user's inputs, conforms to the user's preferences, or conforms to a safety standard as explained above.

In the case of the generative AI models 114 used to generate a control response based on multimodal inputs of at least two personalized interaction data, there are a variety of other technical means to be considered in addition to such means as feature fusion as mentioned above. The following are some of these other technical means and are described specifically in relation to the two multimodal inputs, speech, and text:

1. Feature Cascading: the feature cascading approach involves sequentially joining feature vectors from different modalities, rather than simply merging them. Speech feature vectors are extracted from speech input (e.g., speech feature vector extraction via MFCCs, spectrograms, etc.) and text feature vectors are extracted from text input (e.g., text feature vector extraction via TF-IDF, word embeddings, etc.). Sequentially concatenate the speech feature vectors with the text feature vectors to form a long feature vector. Using the cascaded feature vector as input, control responses are generated by generative AI models (e.g., Variable Auto-Encoders VAEs or Generative Adversarial Networks GANs).

2. Feature Interaction: Feature Interaction involves the cross-combination of features from different modalities within the model to enrich the feature representation. As with feature cascading, the feature vectors of the two modalities are first extracted. Speech feature vectors and text feature vectors are combined through an interaction module (e.g., a multimodal fusion layer), for example, by calculating their element-level products or using an attention mechanism to emphasize the importance of different features. The post-interaction feature vectors are fed into a generative AI model to generate control responses.

3. Co-learning: co-learning approaches allow two or more AI models (such as the generative AI models 114) to learn features of different modalities separately and then share the information through some mechanism. Two or more AI models are trained to process speech and text data separately, and each AI model extracts and represents its modal feature vector. Use some mechanism (e.g., gradient sharing or knowledge distillation) to allow sharing of information between two or more AI models. Combine the feature representations of the outputs of two or more AI models and use them to generate the final response.

4. Attention Mechanism: Attention Mechanism can be used to emphasize which modal features are more important in generating the control response. The feature vectors are extracted separately for speech and text modalities. Through the Attention Mechanism, the attention weights of the speech feature vector and the text feature vector are calculated, and the feature vectors are weighted and summed according to these weights. The weighted feature vectors are fed into a generative AI model (e.g., Recurrent Neural Network RNN, Long Short-Term Memory Network LSTM, or Transformer), and the generative AI model generates a control response based on the weighted feature vectors.

In an embodiment, the process of extracting attributes of each personalized interaction data included in the input and generating feature vectors for each type of personalized interaction data based on the attributes of each type of personalized interaction data correspondingly can be referred to the following explanation:

The following is a concrete description of how to generate feature vectors for personalized interaction data based on the provided data types above, including the data attributes of each data type and how to generate feature vectors based on the extracted data attributes.

1. Data attribute representation of each type of user input data and corresponding feature vector generation:
   a) Data attributes representation of voice input: pitch, volume, speech rate, speech features (e.g., MFCCs), etc. Feature vector generation for voice input: MFCCs, spectral features, etc. are extracted using signal processing techniques and then combined into a feature vector.
   b) Data attributes of text input are represented: vocabulary, grammatical structure, emotional tendency, keyword frequency, etc. Feature vector generation for text input: Text is converted into a high-dimensional vector by NLP techniques such as TF-IDF or word embedding.
   c) Data attributes representation of location data: longitude, latitude, elevation, velocity, etc. Feature vector generation for location data: Encoding location coordinates and other location information as numeric values and combining them into a feature vector.
   d) Data attributes representation of personal information: age, gender, occupation, interest, etc. Feature Vector Generation for Personal Information: Use Unique Heat Coding for categorical data (e.g., gender, occupation) and Normalization for continuous data (e.g., age).

2. Data attribute representation and corresponding feature vector generation for user-content interaction:
   a) Voice input and the text input: same as above.
   b) Other content (e.g., video) interaction behaviors: content type preference, viewing duration, number of replays, skipped content, etc.
   c) Facial expressions: smile, frown, blink frequency, eye opening level, etc. AUs or expression classification labels are extracted using facial recognition algorithms and then encoded as feature vectors.

3. Data attribute representation of ambient parameters with corresponding feature vector generation:
   a) Data attribute representation of ambient parameters of the user may include noise level (e.g., decibel value), lighting conditions (e.g., light intensity and color temperature), temperature, and humidity.
   b) Feature vector generation of ambient parameters: Directly encode the measured values of environmental parameters as numerical features, and then individually as a feature vector or combined into a feature vector.

4. Data attribute representation of physiological parameters and corresponding feature vector generation:
   a) Data attribute representation of heart rate: number of heart beats per minute. The data attribute of skin conductance represents skin conductance level. The data attributes of blood pressure represent systolic and diastolic blood pressure.
   b) Feature vector generation for these physiological parameters: The measured values of heart rate, skin conductance, and blood pressure are normalized and then used individually as a feature vector or combined into a feature vector.

5. Data attribute representation of control mode and corresponding feature vector generation:
   a) Data attribute representation of control parameters: Control parameters such as frequency, speed, direction, intensity, etc.
   b) Feature vector generation for control parameters: Each control parameter is encoded as a numerical feature, or if the parameter is categorical, a solo thermal encoding can be used. The features of all the parameters can then be combined into a feature vector.

6. Data attribute representation for data transmission between the user 102 and the other users 106a-106c (i.e., interaction between users) with corresponding feature vector generation:
   a) Data attribute representation of data transmission between the user and the other users: Frequency, duration, content (e.g., text, voice, etc.), or content type of communication with others.
   b) Feature vector generation between users: Frequency of communication is directly used as a continuous-valued feature, and features of the extracted content (e.g., sentiment tendency, topic classification) or a pretrained model is used to obtain these features.

It should be understood that the feature vectors generated for each personalized interaction data above can be used individually or combined into a more comprehensive feature vector by feature fusion techniques (e.g., cascading, splicing, weighted summing, etc.).

In an embodiment, the input may include fragments of the set of control parameters for sexual stimulation devices 112 and 124 that need to be improved or expanded. In an example, the generative AI models 114 may generate an improved set of control parameters based on the fragments of the set of control parameter. In another example, the generative AI models 114 may fuse the set of control parameters fragment samples of two different sexual stimulation devices to generate the improved set of control parameters.

In an embodiment, the system 110 (or the generative AI models 114) is configured to dynamically control the operation of the sexual stimulation device 112. The sexual stimulation device 112 is dynamically controlled based at least on monitoring the sexual stimulation device 112, the sexual pleasure of the user 102, subsequent action of the user 102, and the like. In another embodiment, the system 110 (or the generative AI models 114) may generate media content corresponding to the input including the at least one personalized interaction data. For example, the media content may be sexually related content. The media content may include at least text data, image data, video data, game content, live broadcast, and audio data. Thereafter, the system 110 transmits the media content to the at least one user terminal 104. Further, the generative AI models 114 generate the control response based at least on one of the media content and the user interaction of the user 102 with the media content.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2:
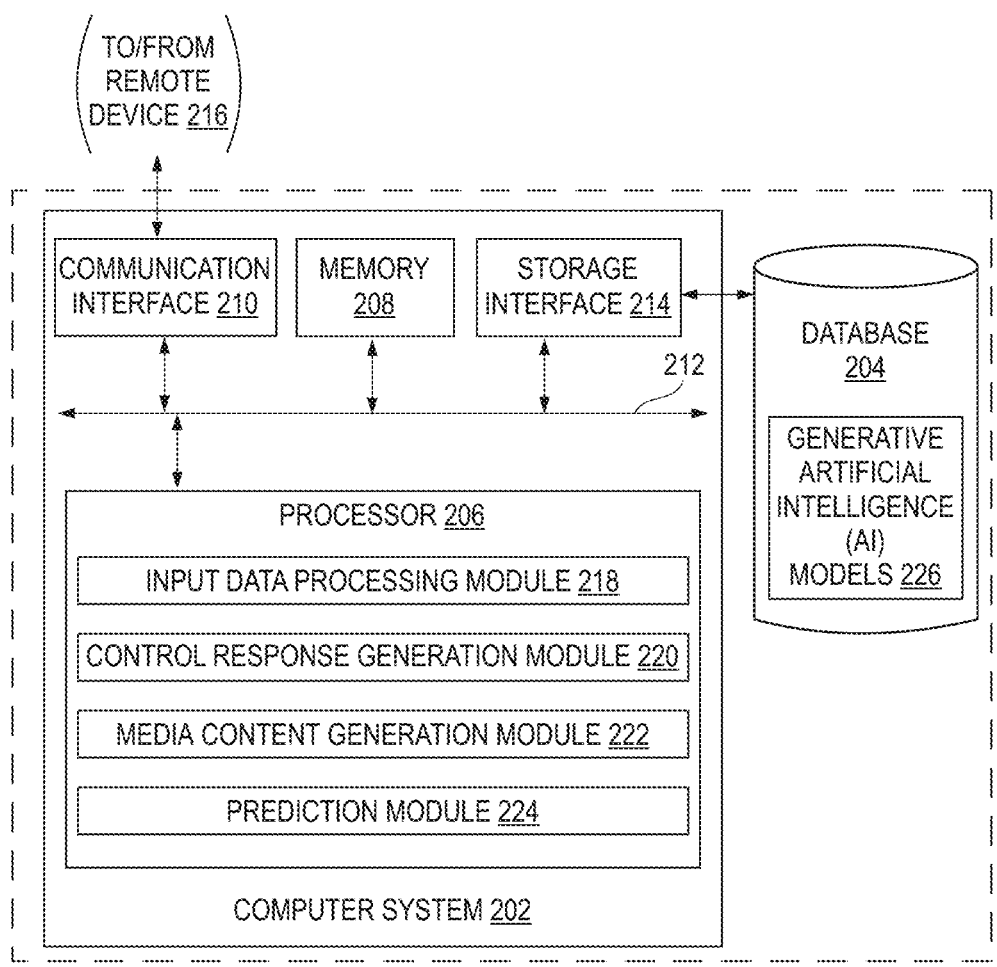
FIG. 2 illustrates a simplified block diagram of a system for generating a control response including a set of control parameters to operate a sexual stimulation device, in accordance with an embodiment of the present disclosure.

FIG. 2 illustrates a simplified block diagram of a system 200 used for providing interactive adult entertainment, in accordance with an embodiment of the present disclosure. The system 200 may be an example of the system 110 of FIG. 1. The system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the application 122 and one or more components of the application 122. Further, the database 204 stores one or more generative artificial intelligence (AI) models 226. The generative AI models 226 are examples of the generative AI models 114 of FIG. 1. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The generative AI models 226 are statistical or machine learning models capable of learning a data distribution and creating new, unseen instances of data based on the learned data distribution (or training dataset). The training dataset for training the generative AI models 226 may include, but not limited to, various user input data including a voice input, a text input, and location data, activities of the content, and the user interaction with the content. the user interaction comprising at least the voice input, the text input, and the facial expressions of the user, ambient parameters, physiological parameters, control mode creation corresponding to the set of control parameters, data transmission between the user and other users (e.g., chat scenarios, friendship scenarios, sharing generated control parameters with strangers, sending the generated control parameters to sexual partners during the chat process, etc.). Additionally, the training dataset may include data related to the generation of the control response such as control parameters defined for sex toys, and multimedia content (such as text, voice, images, physiological parameters, videos, etc.). The multimedia content may complement the use of adult toys or meet the sexual needs of users, thereby better meeting the needs of users and improving the user experience. For example, in addition to generating control parameters, it is also possible to output a very seductive female voice or output a picture of a female body with strong sexual tension, etc.

The training dataset may be pre-processed using one or more data pre-processing techniques (such as cleaning, organizing, and standardizing training data to ensure it is suitable for model input). Thereafter, appropriate generative AI model architectures is selected based on the application scenario, define network structure, loss function, optimizer, and other parameters, and initialize model weights. Some non-exhaustive examples of the generative AI models 226 may include Large Language Models (LLMs), diffusion models (e.g., Denoising Diffusion Probabilistic Models (DDPM)), transformers based sequence generation models (e.g., Autoregressive Transformers). Further, the performance of the generative AI models 226 is evaluated during the training process. Evaluation of the performance of the generative AI models 226 may include the effectiveness of generated data, relevance to actual use, and accuracy of user feedback simulation. Thereafter, adjust model hyperparameters, learning rates, and hint engineering based on evaluation results to optimize the model performance of the generative AI models 226. When the performance of the models (i.e., the generative AI models 226) meets the requirements, the generative AI models 226 are deployed to achieve real-time generation of personalized control parameters based on user input, environmental conditions, and other factors. In addition, the generative AI models 226 may be continuously trained based on feedback from the user 102 or the sexual stimulation device 112, the physiological parameters of the user 102, and the like.

As explained above, the generative AI models 226 are configured to create new data samples, for example, text, images, audio, video, and control parameter sequences. Typically, the generative AI models 226 trained with the training dataset generates independent or new data points that are similar to the training data. The generative AI models 226 typically implement techniques such as probability modeling, maximum likelihood estimation, variational inference, and adversarial learning to approximate or directly simulate the data generation process to achieve the ability to sample and generate new data from latent spaces.

In an embodiment, the generative AI models 226 may include at least two generative AI models that combinedly function with each other to process the personalized interaction data and generate the control response as explained above. In one embodiment, the at least two generative AI models (such as the generative AI models 226) may be connected in a sequential connection configuration. In the sequential connection configuration, the generative AI models 226 processes the personalized interaction data in a specific order. For example, each generative AI model in the at least two generative AI models 226 is assigned to perform a specific subtask, where the previous generative AI model's output serves as input to the subsequent generative AI model. For example, a generative AI model among the at least two generative AI models 226 may be used as a preprocessing model for text cleaning and standardization. Further, another generative AI model of the at least two generative AI models 226 may be used as a feature extraction model used for extracting the key features (or the set of attributes) from the personalized interaction data.

In another embodiment, the generative AI models 226 may be connected in a parallel connection configuration. In this scenario, the personalized interaction data is simultaneously fed into multiple generative models (i.e. the generative AI models 226) for processing. Further, each generative model of the generative AI models 226 may focus on different feature spaces or task perspectives. The branch results may be used independently (such as for different tasks or goals), or may be fused to obtain comprehensive decisions. For example, in computer vision, multiple convolutional neural network branches may be used in parallel to extract input features of different types, and then fused features for recognition through attention mechanisms or weighted averaging as explained above. Alternatively, the generative AI models 226 may independently process the same input, and their respective outputs (such as classification probabilities or regression values) are averaged, weighted average, or other statistical aggregates to improve the stability and accuracy of overall predictions.

In another embodiment, the generative AI models 226 may be connected in a hybrid connection configuration. The generative AI models 226 may include both series and parallel connections, forming a hierarchical network structure. For example, in semantic analysis, parallel word embedding models and syntax parsing models may be used as the generative AI models 226 to process text. The results of both the generative AI models 226 may be merged and input into a sequence annotation model (i.e., the generative AI models 226) to identify entities and relationships.

In another embodiment, the generative AI models 226 may be connected in a model fusion configuration. In one example, during the initial data processing stage, data or features from different sources are merged to form a unified input and fed into the subsequent generative AI models 226. In another example, the generative AI models 226 may independently process personalized interaction data until the decision stage and the output of each of the generative AI models 226 is fused. In another example, multiple speech recognition models (i.e. the generative AI models 226) recognize a segment of speech separately, and the final result is fused based on the probability distribution of the recognition results of each generative AI model 226.

As explained above, the system 200 including the generative AI models 226 may be embodied in the user terminal 104 and/or the user devices 108a-108c. In this scenario, the generative AI models 226 may run on the user terminal 104 without the need to connect to the Internet. In particular, the user 102 may need to download the weights and architecture of the generative AI models 226 from an open-source platform rendering the services of the generative AI models 226. Thereafter, the runtime environment is configured on the user terminal 104 with large learning models (LLMs), a deep learning framework, and model-specific libraries. Thereafter, the downloaded model weights are loaded onto the model architecture of the generative AI models 226 in the local environment using appropriate libraries and tools. Finally, the generative AI models 226 are implemented i.e., writing or using off-the-shelf scripts to perform text generation or other tasks using the loaded models, with all processing done locally. The above model architecture of the generative AI models 226 deployed in the user terminal 104 is for exemplary purposes, and therefore it is not explained in detail for the sake of brevity. Further, the above model architecture of the generative AI models 226 may be implemented in the system 200, in case the system 200 is located remotely and is communicably coupled to the user terminal 104.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the system 200, as described herein. In some embodiments, the memory 208 may be realized in the form of a database or cloud storage working in conjunction with the system 200, without deviating from the scope of the present disclosure.

The processor 206 is operatively coupled to the communication interface 210 such that the processor 206 is capable of communicating with a remote device 216 such as the user terminal 104, the user devices 108a-108c, the sexual stimulation device 112, or with any entity connected to the network 120 as shown in FIG. 1.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the processor 206 includes an input data processing module 218, a control response generation module 220, a media content generation module 222, and a prediction module 224. The one or more components of the processor 206 as described above are communicably coupled with the application 120.

The input data processing module 218 includes suitable logic and/or interfaces for obtaining the personalized interaction data from the at least one user terminal 104 associated with the user 102. The personalized interaction data is obtained based at least on the set of actions associated with the user 102 while using at least the sexual stimulation device 112, the user input data, and the user interaction with the content. In one scenario, the input may include a single personalized interaction data obtained based on the set of actions associated with the user 102 while using at least the sexual stimulation device 112, the user input data, and the user interaction with the content. For example, the input including the single personalized interaction data may include a voice input, a text input, location data of the at least one user terminal 104 of the user 102, activities performed in the content, the user interaction (such as the voice input, the text input, and the facial expressions of the user 102) with the content, ambient parameters of the user 102, physiological parameters of the user 102, data transmission (such as sending the generated control parameters, chat scenario, etc.,) between the user 102 and the other users 106a-106c. In this scenario, the input data processing module 218 identifies the type of input (i.e., the single personalized interaction data). The personalized interaction data the generative AI models 226 to generate corresponding control parameters which will be explained further in detail.

Further, the input data processing module 218 in conjunction with the generative AI models 226 analyzes the personalized interaction data to determine the user's (i.e. the user 102) current sexual needs. The input data processing module 218 extracts the set of attributes from the personalized interaction data. Further, the input data processing module 218 generates the set of feature vectors corresponding to the input based on the set of attributes. In particular, the input data processing module 218 generates the first set of feature vectors corresponding to the single personalized interaction data. For example, the input may include image data of the content being viewed by the user 102 using the user terminal 104a. In this example, the input data processing module 218 extracts the pixel intensity (i.e., the attributes) of the image data. Thereafter, the input data processing module 218 extracts the high-level features or the first set of feature vectors (e.g., objection detection, shape identification) from the image data. The input data processing module 218 may assign a weight age for the personalized interaction data to indicate the relevance of the personalized interaction data in the generation of the control response.

In another scenario, the input data processing module 218 may receive the input including the at least two personalized interaction data. Similar to the input including the single personalized interaction data, the input including the at least two personalized interaction data may be obtained based on the set of actions associated with the user 102 while using at least the sexual stimulation device 112, the user input data, and the user interaction with the content. In other words, the input data processing module 218 performs multimodal data acquisition (i.e., obtaining the input including the at least two personalized interaction data. Further, the at least two personalized interaction data may include the voice input, the text input, the location data of the at least one user terminal 104 of the user 102, the activities performed in the content, the user interaction (such as the voice input, the text input, and the facial expressions of the user 102) with the content, the ambient parameters of the user 102, the physiological parameters of the user 102, the data transmission (such as sending the generated control parameters, chat scenario, etc.,) between the user 102 and the other users 106a-106c. In this example, the input data processing module 218 extracts the attributes of each input type of the at least two personalized interaction data. Thereafter, the input data processing module 218 generates the second set of feature vectors corresponding to each personalized interaction data of the at least two personalized interaction data. For example, the input may include two different types of inputs (or the personalized interaction data) such as a voice command and a facial expression of the user 102. In this scenario, the input data processing module 218 extracts the set of attributes from each input type separately (e.g., the voice command and the facial expression) and convert each input type from different modalities into comparable feature vectors (i.e., the second set of feature vectors).

Further, the input data processing module 218 generates a fused feature vector based at least on merging the second set of feature vectors of each input type of the at least two personalized interaction data by implementing the neural network. In other words, the extracted multimodal features (i.e., the second set of feature vectors) are fused through the deep neural networks, to generate the fused feature vector that contains the comprehensive impact of each modal data or the personalized interaction data on the generation of control parameters. The fusion feature vector is provided as input to the generative AI models 226. It is to be noted that the multi-source input (or the at least two personalized interaction data) expands the perceptual dimension of controlling the sexual stimulation device 112. In other words, the fused feature vector represents the common influence of all personalized interaction data and navigates the generative AI models 226 to generate the control response. The generated control response reflects the user's (i.e., the user 102) true intentions and environmental characteristics which will be explained further in detail.

In an embodiment, the input data processing module 218 in conjunction with the generative AI models 226 may generate media content corresponding to the input (including either the single personalized interaction data or the at least two personalized interaction data). The media content may include, but not limited to, at least text data, image data, video data, game content, live broadcast, and audio data. For example, the media content may be adult content such as sexually related virtual reality (VR) content, sexually related audio content, sexually related e-books, sexually related video content, and sexually related game content. For example, the generative AI models 226 generates the media content (or the adult content) such as sex novels based on the conversation context related to sex between the user 102 and the other users (such as the user 106a) The other user 106a may be a sexual partner of the user 102. The user 102 may send the generated sex novels to the other user 106a via the application 122.

The input data processing module 218 obtains the personalized interaction data for the generation of the control response based on the media content and/or the user interaction of the user (such as the user 102) with the media content. In this scenario, the personalized interaction data includes the at least one sequence of the media content and/or the user interaction with the media content. The result of the user's (i.e. the user 102) interaction with the adult content (or the media content) may include the interaction result of the user 102 with respect to the sexually related virtual reality content, voice interaction result of the user 102 with respect to the sexually related voice content, interaction result of the user 102 with respect to the reading of the sexually related e-book, interaction result of the user 102 with respect to the browsing of the sexually related video content, and operation interaction result of the user 102 with respect to the sexually related game content. This eliminates the need for the users (such as the user 102) to manually control the sexual stimulation device 112. Further, this enables synchronous control of the sexual stimulation device 112 while browsing or interacting with media content being generated by the input data processing module 218 which will be explained further in detail.

The control response generation module 220 includes suitable logic and/or interfaces for generating the control response based at least on the set of feature vectors corresponding to the input including the at least one personalized interaction data. The control response is generated based at least on the generative artificial intelligence (AI) models 226. As explained above, the input may include either the single personalized interaction data or the at least two personalized interaction data.

In one example, the input includes the single personalized interaction data such as the voice input. The control response generation module 220 in conjunction with the generative AI models 226 analyzes the voice input (or the first set of feature vectors) to determine the user's current sexual needs. As a result, the control response generation module 220 with access to the generative AI models 226 generates the control response with access to the training dataset. The control response is transmitted to the user terminal 104a to operate the sexual stimulation device 112. In another example, the input includes the two personalized interaction data such as the voice command and the facial expression of the user 102. In this scenario, the control response generation module 220 with access to the generative AI models 226 analyzes each input type i.e., the voice input and the facial expression of the user 102 (or the second set of feature vectors). Thereafter, the control response generation module 220 generates the control response for operating the sexual stimulation device 112 to satisfy the personalized sexual entertainment needs of the at least one user 102 or the other users 106a-106c.

In one scenario, the control response generation module 220 may determine the set of control parameters corresponding to processing the input including either the single personalized interaction data or the at least two personalized interaction data. The set of control parameters may include, but not limited to, operating time, operating frequency (e.g., vibration frequency of the sexual stimulation device), operating intensity (e.g., vibration intensity of the sexual stimulation device),operating angle (e.g., angle of rotation or oscillation of the sexual stimulation device), operating temperature (e.g., heating temperature of the sexual stimulation device), operating speed (e.g., speed of rotation of the sexual stimulation device), operating distance (e.g., distance of linear reciprocal movement of the sexual stimulation device), operating amplitude (e.g., contraction amplitude or expansion amplitude of the sexual stimulation device) and the like. The set of control parameters is determined corresponding to the input for operating the sexual stimulation devices 112 or 124 to satisfy the personalized sexual entertainment needs of the at least one user 102 or the other users 106a-106c. The control response including the set of control parameters is transmitted to the user terminal (such as the user terminal 104a) through the application 122. The user terminal 104a operates the sexual stimulation device 112 based on the set of control parameters. The sexual stimulation devices 112 and 124 performs sexual stimulation actions including, but not limited to sliding friction, vibration, linear reciprocating movement, rotation, swinging, thrusting, bending, expansion, contraction, opening, closing, liquid ejection, and the like, based on the set of control parameters.

In another scenario, the control response generation module 220 generates a control instruction appended with the set of control parameters defined for operating the sexual stimulation device 112 of the user 102 or the sexual stimulation device 124 of the other users 106a-106c. In one scenario, the control response generation module 220 transmits the control instruction to the user terminal (such as the user terminal 104a). The user terminal 104a operates the sexual stimulation device 112 based on the set of control parameters appended in the control instruction. In an embodiment, the control response generation module 220 may transmit the set of control parameters to the user terminal 104a through the application 122. The application 122 generates the control instruction based on the set of control parameters received from the control response generation module 220. The application 122 triggers the sexual stimulation device 112 to operate based on the set of control parameters in the control instruction.

In another scenario, the control response generation module 220 generates the control response including the auxiliary response appended with the coded data (as non-direct form of control parameters) representing the set of control parameters. For example, the coded data may include numerical values, alphanumeric code, control graph, and the like. The coded data are predefined for the set of control parameters corresponding to the input including various types of inputs as explained above. The auxiliary response appended with the coded data that represent the set of control parameters is transmitted as the control response to the user terminal 104a through the application 122. The application 122 determines the set of control parameters based on the coded data in the auxiliary response. Thereafter, the application 122 operates the sexual stimulation device 112 based on the set of control parameters.

In an embodiment, the processor 206 determines the personalized sexual entertainment needs of the at least one user 102 through the one or more generative artificial intelligence (AI) models 114 based on the input. The input may include the at least one personalized interaction data being directly or indirectly related to the personalized sexual entertainment needs of the at least one user 102. The processor 206 generates the control response matching the personalized sexual entertainment needs of the at least one user 102 through the one or more generative artificial intelligence (AI) models 114. Specifically, the processor 206 utilizes the generative AI models 114 (e.g., a Transformer-based deep learning network) to analyze the personalized interaction data. As explained above, the personalized interaction data may include user input data (e.g., voice commands, text inputs, and location information), personal profiles, the user's voice and textual feedback while viewing or engaging with content, facial expressions, environmental parameters (e.g., the sound, light, and temperature) and the user's physiological parameters (e.g., heart rate, respiration rate, etc.). The generative AI models 114 are able to accurately capture the complex information embedded in these personalized interaction data, and thus are able to deeply understand and predict users' explicit or latent personalized sexual entertainment intentions or personalized sexual entertainment needs. Unlike traditional machine learning models, the generative AI models 114 not only identify and reinforce existing user preferences, but also creatively generate new content to discover and satisfy latent needs that users (such as the user 102) may not have expressed or realized.

Once the generative AI models 114 has parsed the user's personalized sexual entertainment needs, the processor 206 then initiates the generation process to create control responses that match the user's personalized sexual entertainment needs. The control response may adjust the operating modes (e.g., intensity, frequency, etc.) of the sexual stimulation device, customize the generation of sexual entertainment content that matches the user's personalized sexual entertainment needs (e.g., the Customized generation of screen content, storyline, character interaction, etc. that matches the user's personalized sexual entertainment needs). The sexual entertainment experience is highly tailored to the user's (such as the user 102) current personalized sexual entertainment needs. The generative AI models 114 has the ability to learn dynamically, and it can be continuously optimized based on user feedback and behavioral changes, which means that the personalized sexual entertainment suggestions provided by the generative AI models 114 are improved over the time. This self-evolutionary mechanism based on real-time data analysis and instantaneous content generation enables the generative AI models 114 to generate control responses that increasingly meet the personalized sexual entertainment needs of users (e.g., the user 102). For example, by analyzing the user's voice emotions, key words in the text, trends in facial expressions or/and subtle fluctuations in physiological parameters (e.g., heart rate, respiratory rate, etc.), the generative AI models 114 can construct the user's personalized preferences in terms of sexual entertainment needs. Further, the generative AI models 114 can also be combined with real-time data on environmental parameters (e.g., light, temperature, noise level) to generate the control response that allow the user's sexual entertainment experience to blend seamlessly with the user's physical environment.

Additionally, the generative AI models 114 may determine the personalized sexual entertainment needs of the user 102 based on the data feature vectors extracted from the single personalized interaction data. Further, the generative AI models 114 may determine the personalized sexual entertainment needs of the user 102 based on at least two data feature vectors extracted from at least two multimodal inputs such as the at least two personalized interaction data. When determining the personalized sexual entertainment needs of the user 102, the generative AI models 114 may extract relevant data features from the single or multiple personalized interaction data through the relevant feature extraction method mentioned above, so as to form an accurate understanding of the personalized sexual entertainment needs of the user 102. For example, the generative AI models 114 determine the user's 102 personalized sexual entertainment needs based on the single personalized interaction data, such as using only the user's voice input as the source of information. In this example scenario, the generative AI models 114 initially preprocesses the voice signal and extracts acoustic features, such as intonation, rhythm, and keywords. Subsequently, the features will be transformed into a data feature vector representing the user's emotional state and potential interest pointers at that moment. The generative AI models 114 refer to this vector, combined with its built-in learning experience, to infer the user's possible sexual entertainment needs, such as a preference for a certain type of sexually stimulating experience with a sexual stimulation device or the generation of a specific type of adult content. In another example, the generative AI models 114 determines the user's 102 personalized sexual entertainment needs based on multimodal inputs such as multiple personalized interaction data. In this scenario, the generative AI models 114 independently extracts feature vectors for each type of personalized interaction data, such as emotional features of speech, semantic features of text, and emotional intensity of facial expressions. The feature vectors are integrated together by the multimodal feature processing method mentioned above, which reflects the state of the user's sexual entertainment experience in a more comprehensive and detailed way than the information of a single modality. The generative AI models 114 utilize the multidimensional data structure to synthesize and determine the user's complex and nuanced sexual entertainment needs, which may include preferences for content themes, interaction styles, and even environmental atmospheres.

In an embodiment, the generative AI models 114 may employ relevant generative algorithms to generate control responses that match personalized sexual entertainment needs. These algorithms may include Generative Adversarial Networks (GANs), Variable Auto-Encoders (VAEs), or Transformer-based generative models, among others. The algorithms are capable of generating control responses that match expectations, such as parameter settings for sexual stimulation devices or specific descriptions of sexual content, based on knowledge learned from the model and the user's 102 personalized sexual entertainment needs. The control response that matches personalized sexual entertainment needs means tailoring an exclusive sexual entertainment experience for each user (such as the user 102) based on the identified unique personalized sexual entertainment needs of the user 102, including, but not limited to, fine control of the sexual stimulation device 112 and personalized generation of sexual content. For example, with respect to the control of sexual stimulation devices, some users may prefer a strong sense of stimulation, while others prefer a milder experience. Through the learning and inference of the generative AI models 114, each user (e.g., the user 102) can be provided with precise stimulation intensity and control to meet their individual needs. Meanwhile, in terms of sexual content generation, video, audio or text content can be generated to match the user's 102 personal preferences.

In an embodiment, the generative AI models 114 explicitly determines the user's 102 personalized sexual entertainment needs based on inputs from the user's 102 implicit or ambiguous personalized sexual entertainment needs. Based on the determined personalized sexual entertainment needs, the generative AI models 114 generate the control response that is at least motivated or constrained by the determined personalized sexual entertainment needs. In other words, the generated control response may conform to the user's 102 specific personalized sexual entertainment needs. In an exemplary scenario, the personalized interaction data may include a voice prompt from the user 102. The voice input may include 'I think it's too dense, I don't like it'. The system 110 may characterize the voice prompt and tag the user's 102 personalized sexual entertainment needs based on the results of the characterization. Further, the system 110 may calculate the probability that the voice prompt belongs to each personalized sexual entertainment need label. Thereafter, the system 110 selects the control response generation scheme corresponding to the personalized sexual entertainment need label with the highest probability of generating the control response that meets the user's 102 current personalized sexual stimulation needs. For example, the system 110, for this voice prompt uttered by the user, after analyzing the features, analyses that the personalized sexual entertainment demand labels may include:['reduce intensity', 'accelerate', 'decelerate', 'Enhance intensity' ], and calculated the probability of each personalized sex entertainment demand label is: [0.414, 0.220, 0.198, 0.166]. The system 110 selects the highest probability personalized entertainment demand label 'reduced intensity' and generates the control response based on this personalized entertainment demand label. The control response may include parameters, such as reducing the stimulation intensity of a sexual stimulation device and achieving a stimulation intensity value that meets the personalized sexual entertainment needs of the user 102.

In an embodiment, the generated control response may be sent to the user terminal 104 or the sexual stimulation device 112 of the user 102 providing the personalized interaction data. In another embodiment, the generated control response may be sent to the user devices 108a-108c or the sexual stimulation device 124 of the other users 106a-106c. In one scenario, a first user (e.g., the user 102 watching a live performance of a model or a local user who is interacting in a remote chat) may remotely control the sexual stimulation device 124 of a second user (e.g., the user 106a or a model or a sexual partner who is interacting with the local user in a chat). In this scenario, the system 110 may generate the control response based on the personalized interaction data of the first user through the generative AI models 114. The system 110 further transmits the control response to the user device (e.g., the user device 108a) of the second user (e.g., the user 106a). The user device 108a of the user 106a may control the sexual stimulation device 124 of the user 106a to perform a sexually stimulating operation corresponding to the control response to satisfy the personalized sexual entertainment needs of the user 102 for the user 106a. In another scenario, the first user (e.g., the user 102) is using the sexual stimulation device 112 for sexual entertainment. In this scenario, the system 110 may generate the control response based on the personalized interaction data of the user 102 by the generative AI models 114. Thereafter, the system 110 transmits the control response to the user terminal 104 of the user 102. The user terminal 104 of the user 102 may control the sexual stimulation device 112 to carry out the sexual stimulation operation corresponding to the control response, thereby satisfy the personalized sexual entertainment needs of the user 102.

Additionally, the control response generation module 220 is configured to obtain the personalized interaction data based on the media content and the user interaction with the media content generated by the input data processing module 218 as explained above. In one example, the generative AI models 226 along with the input data processing module 218 generates the media content such as sex novels based on the conversation context related to sex between the user 102 and the other users (such as the user 106a). It is to be understood that the conversation context related to sex between the user 102 and the other users (such as the user 106a) is the personalized interaction data for the generative AI models 226 to generate the media content. The media content may be access by the user 102 via the application 122 hosted and managed by the system 200 or the system 110. Further, the control response generation module 220 with access to the generative AI models 226 generates the set of control parameters for operating the sexual stimulation device 112 based on the developmental trajectory of the sexual plot in a sex novel. For instance, the developmental trajectory of the sexual plot in a sex novel includes gentle touching of the genitals before intense sexual activity. As a result, the generative AI models 226 along with the control response generation module 220 generates the corresponding set of control parameters for operating the sexual stimulation device 112. The set of control parameters may operate the sexual stimulation device 112 to provide gentle vibration stimulation for a period of time. In another example, the user 102 may use annotation mode on the mobile interface (i.e. the user terminal 104) to specifically label certain sexual scenes in the theory of sex novels. For instance, gently touching a woman's genitals, or patting a woman's buttocks. Based on the user interaction with the media content, the generative AI models 226 analyses the user's (i.e. the user 102) current sexual impulse is strong. To that effect, the control response generation module 220 in conjunction with the generative AI models 226 generates the set of control parameters corresponding to the user interaction with the media content. In this way, the user 102 may synchronously control the sexual stimulation device 112 while reading the sex novels (i.e. the media content), thereby providing enhanced sexual stimulation to the user 102. Additionally, or alternatively, the control response generation module 220 with access to the generative AI models 226 may generate the set of control parameters for the sexual stimulation device 112 based on the user's (i.e. the user 102) browsing interaction with the sex novels (i.e. the media content).

The control response generation module 220 in conjunction with the generative AI models 226 extracts the set of control parameters corresponding to the input comprising the at least one personalized interaction data from the database 204. In particular, the generative AI models 226 computes a matching score based at least on mapping each feature vector of the set of feature vectors of the personalized interaction data with a predefined control parameters list stored in the database 204. The matching score may be represented in numerical value. The matching score indicates the relevance of the personalized interaction data (or the set of feature vectors) and the set of control parameters of the predefined control parameters list stored in the database 204. Thereafter, the generative AI models 226 along with the control response generation module 220 determines the set of control parameters from the predefined control parameters list stored in the database 204. Specifically, the set of control parameters is determined corresponding to a feature vector among the set of feature vectors assigned with the matching score greater than a threshold score. For example, the relevance of a few feature vectors among the set of feature vectors upon mapping with the predefined control parameter list may be assigned with the matching scores of about 94%, 97%, and 99%. The threshold score is selected as the highest magnitude of the matching score. Hence, the feature vector assigned with the matching score of 99% is selected and the corresponding set of control parameters from the predefined control parameter list is extracted. Further, the control response generation module 220 along with the generative AI models 226 generates the control response based on the set of control parameters for operating the sexual stimulation device 112 of the user 102.

Further, the control response generation module 220 optimizes the initially generated set of control parameters suitable for operating the sexual stimulation device 112 of the user 102 based at least on the generative AI models 226. In an embodiment, the control response generation module 220 monitors an operating state of the sexual stimulation device 112 operating based on the set of control parameters. The operating state may include at least a high vibration mode, a low vibration mode, an intermittent vibration mode, and the like. The control response generation module 220 dynamically adjusts the set of control parameters for adjusting the operating state of the sexual stimulation device 112 based at least on the one or more generative artificial intelligence (AI) models 226. For example, the control response generation module 220 dynamically adjusts the set of control parameters for adjusting the operating state of the sexual stimulation device 112 that is suitable for the sexual stimulation device 112.

In addition, the control response generation module 220 may further optimize the initially generated set of control parameters with relevant reference data that is suitable for operating the sexual stimulation device 112 and improving the masturbation experience of the user 102. In this scenario, the input data processing module 218 obtains the personalized interaction data that includes at least one of equipment information of the sexual stimulation device 112, operating settings of the sexual stimulation device 112 defined by the user 102, and the physiological parameters of the user 102. The equipment information may include, but not limited to, model name, performance information, and working parameters of the sexual stimulation device 112. The operating settings of the sexual stimulation device 112 defined by the user 102 may include vibration intensity preference, operating time, and the like. The physiological parameters of the user 102 may include heart rate, skin electric response, respiratory rate, and the like. In one example, the user's (i.e. the user 102) heart rate is very fast. As a result, the initially generated set of control parameters including the stimulus intensity or stimulus frequency is dynamically adjusted (such as decreasing the stimulus intensity) in real time to avoid affecting the sexual pleasure experienced by the user 102. In another example, the current stimulation frequency or intensity of the sexual stimulation device 112 is high. In this scenario, the set of control parameters (such as stimulation intensity or stimulation frequency) generated initially may be adjusted appropriately (such as decreasing the stimulus intensity) in real time.

In one example, the users (e.g., the user 102) using the sexual stimulation device 112 may provide the voice input (such as moaning sounds). Meanwhile, the generative AI models 226 monitors the real-time physiological parameter changes (e.g., heart rate) of the user 112 and determines that the heart rate is gradually accelerated. Thereafter, the generative AI models 226 fuses and analyzes the physiological parameters (accelerated heart rate) with the moaning sounds of the user 102 to determine the sexual experience state of the user 102. In this example scenario, the generative AI models 226 may determine that the user 102 is in a state of gradual enhancement. To that effect, the generative AI models 226 adjusts the set of control parameters for operating the sexual stimulation device 112 corresponding to the vibration frequency, the rhythm of the moaning sounds. In particular, the generative AI models 226 may moderately increase the vibration intensity in response to the user's increased heart rate, thus creating a physiologically responsive experience for the user 102.

In an embodiment, the control response generative module 220 may be configured to generate the control response based on the ambient parameters of the user 102. The ambient parameters may include ambient sound, ambient temperature, and humidity. The ambient parameters may be obtained while the sexual stimulation device 112 is operating or during sexual interaction. For example, when the user 102 uses the sexual stimulation device 112 at a premise (home), ambient sensors installed in the room continuously monitor the ambient parameters such as the ambient sound, temperature, and humidity. The application 122 determines the predetermined conditions based on monitoring the ambient parameters. The predetermined conditions in the case of the ambient parameters may include rain, warm indoor lighting, romantic music, and the like. The generative AI models 226 generate the control response including the set of control parameters or the auxiliary response corresponding to the ambient parameters. In one example, the generative AI models 226 may generate a vibration sequence that mimics the rhythm of raindrops hitting windows, or adjust the vibration frequency to create a personalized stimulating experience that blends with the surrounding environment as the music melody changes. In another example, based on the sound of friction or collision emitted by the user 102 when operating the sexual stimulation device 112, the current usage status (such as intense or slow usage status) of the sexual stimulation device 112 of the user 102 is transmitted as the personalized interaction data to the system 200 through the application 122. In this scenario, the generative AI models 226 generate the set of control parameters based on the sounds, to provide timely feedback control for the adaptation of the sexual stimulation device 112 to the current usage status.

In one embodiment, the user input data of the user 102 may include user personal information such as gender, age, and sexual stimulation preferences. The generative AI models 226 generate the set of control parameters based on the user's personal information for operating the sexual stimulation device 112. It is to be understood that the generative AI models 226 may be trained with a dataset including a variety of personal information (including different age groups, gender of the users, corresponding sexual stimulation preferences, etc.) for generating the control response. In another embodiment, the personalized interaction data may be specified as the personal information (including their gender, age, and sexual stimulation preferences) of the user 102 and the sexual partner (the user 106*a*) of the user 102. In this scenario, the generative AI models 226 may generate the set of control parameters corresponding to the personal information of the user 102 and the user 106*a* for operating the sexual stimulation device 112. Hence, the usage or the sexual stimulation preferences of the user 102 and the user 106*a* may be integrated for generating the set of control parameters for operating the sexual stimulation device 112.

The media content generation module 222 includes suitable logic and/or circuitry for generating entertainment content to be appended with the control response. In particular, the media content generation module 222 is configured to generate at least text content, image content, video content, and audio content applicable to the operation of the sexual stimulation device 112. The text content, the image content, the video content, and the audio content generated by the media content generation module 222 are collectively referred to as 'the entertainment content'. In one example, the text content, the image content, the video content, and the audio content generated by the media content generation module 222 may be related to sexually related entertainment content.

The media content generation module 222 with access to the generative AI models 226 generates the entertainment content based on the control response appended with the set of control parameters. In other words, the set of control parameters in the control response may be used as the input by the media content generation module 222 to generate the entertainment content related to the control effect of the set of control parameters. The entertainment content (i.e., the text content, the image content, the video content, and the audio content generated by the media content generation module 222) is appended in the control response and transmitted to the user terminal 104*a* through the application 122. The application 122 may display the entertainment content in the user terminal 104*a* to the user 102 while the sexual stimulation device 112 of the user 102 is operated based on the set of control parameters in the control response. This allows the users (such as the user 102) to experience sexual stimulation by operating the sexual stimulation device 112 while watching the entertainment content related to the set of control parameters. In one example, the set of control parameters is used to operate the sexual stimulation device 112 to produce higher vibration intensity for a period of time. In this scenario, the media content generation module 222 with access to the generative AI models 226 may generate the media content such as the image data corresponding to a visual effect to be rendered on the user terminal 104*a*. The visual effect may include, but not limited to, simulated animations or text explanations indicating the strong vibration mode of the sexual stimulation device 112 based on the set of control parameters. In another example, the media content generation module 222 with access to the generative AI models 226 may generate the media content, for example, the video content that synchronizes and intensifies the masturbation actions of digital humans. In this scenario, when controlling the sexual stimulation device 112 based on the set of control parameters, the video content related to the control effects of the set of control parameters is displayed to the user 102 in the application 122. This provides enhanced sexual pleasure to the user 102 while controlling the sexual stimulation device 112 based on the set of control parameters.

The prediction module 224 includes suitable logic and/or interfaces for predicting the upcoming demand of the users (such as the user 102) for operating the sexual stimulation device 112 based on the generative AI models 226. In particular, the prediction module 224 with access to the generative AI models 226 predicts a subsequent action of the user 102 based on the personalized interaction data associated with the user 102. The subsequent action of the user 102 may include a sexual arousal state of the user 102. Thereafter, the control response generation module 220 along with the generative AI models 226 generates the control response corresponding to the predicted subsequent action of the user 102. In an example, the personalized interaction data associated with the user 102 may include the current physiological parameters of the user 102. The generative AI models 226 is configured to analyze the current physiological parameters of the user 102 to determine the sexual arousal state of the user 102. For instance, the current heartbeat and the blood pressure (i.e., the physiological parameters) are gradually accelerating. Based on the above physiological parameters, the prediction module 224 predicts that the user 102 will enter an orgasmic state (i.e. the subsequent action) in 3 seconds. In this scenario, the generative AI models 226 along with the control response generation module 220 generates the set of control parameters of the control response corresponding to the subsequent action (i.e., user's orgasmic state). In this way, the sexual stimulation device 112 is controlled to switch to the corresponding new control parameters for operation after 3 seconds.

In an embodiment, the generative AI models 226 are continuously trained in real-time based at least on the execution of the one or more operations (such as the generation of the control response including the set of control parameters, the media content, the auxiliary response, etc.). The one or more operations executed by the system 200 may be the feedback/input for training the generative AI models 226. Additionally, the personalized interaction data of the user 102 or the other users 106*a*-106*c* through the application 122 may be used as feedback for training the generative AI models 226.

Figure 3A:
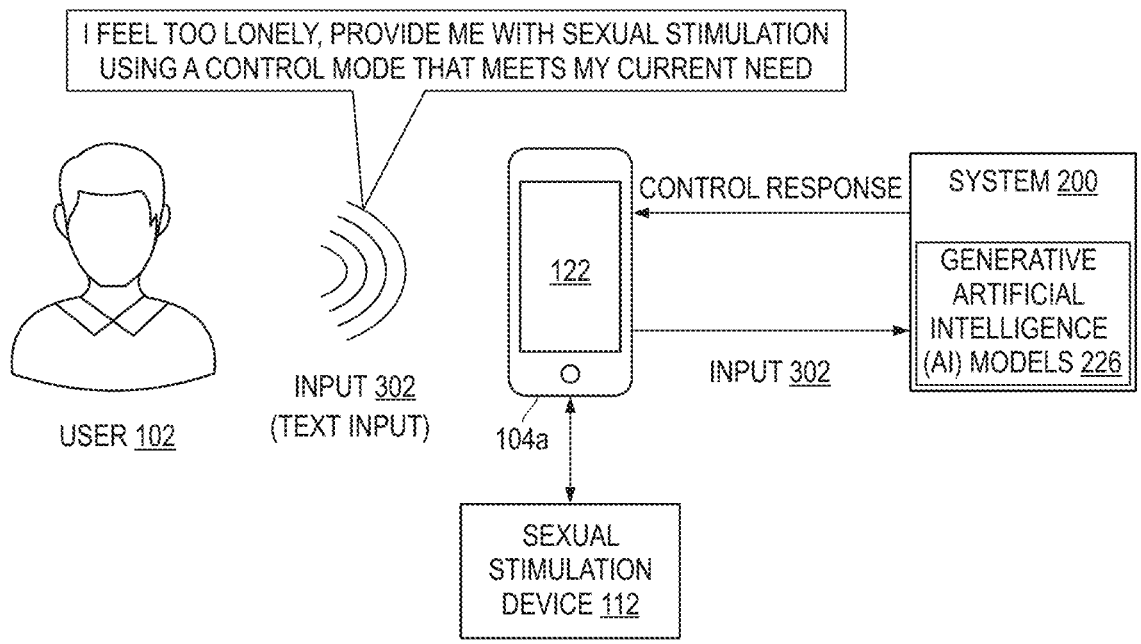
FIGS. 3A, 3B, 3C, 3D, and 3E illustrate example scenarios of processing input including a single personalized interaction data for generating the control response, in accordance with an embodiment of the present disclosure.

Referring to FIG. 3A in conjunction with FIG. 2, an example scenario of processing an input 302 including a single personalized interaction data (such as the voice input) to generate the control response is illustrated. In this example scenario, the personalized interaction data 302 may include a voice input (exemplarily depicted as "I feel too lonely, provide me with sexual stimulation using a control mode that meets my current need"). The voice input 302 is transmitted from the application 122 to the system 200. The generative AI models 226 analyze the user's 102 voice input 302 to determine the current sexual needs of the user 102. The generative AI models 226 further generates the control response including the set of control parameters or the auxiliary response for operating the sexual stimulation device 112 corresponding to the user's 102 current sense of loneliness based on the input 302. For example, the vibration amplitude of the sexual stimulation device 112 is set relatively large, and the vibration frequency of the sexual stimulation device 112 is relatively fast. This provides the user 102 with stronger sexual stimulation to meet the sexual loneliness of the user 102. In an embodiment, the user 102 may provide the text input corresponding to "I feel too lonely, provide me with sexual stimulation using a control mode that meets my current need". The generative AI models 226 generates the control response corresponding to the text input as explained above.

Figure 3B:
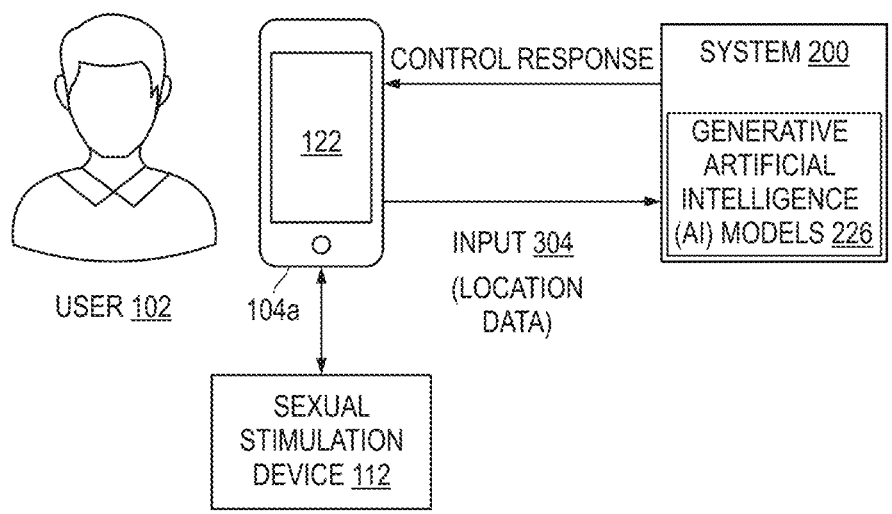

Referring to FIG. 3B in conjunction with FIG. 2, an example scenario of processing an input 304 including a single personalized interaction data (such as the location data of the at least one user terminal 104) to generate the control response is illustrated. The generative AI models 226 generates the set of control parameters for the sexual stimulation device 112 based on the parameters of the user terminal 104*a* (such as positioning, movement acceleration, tilt direction, movement trajectory, etc.). For example, the user 102 is in a private space on a beach and meets the predetermined conditions, such as when the user terminal 104*a* detects the activation of the sexual stimulation device 112. In this scenario, the user terminal 104*a* transmits the location data (or the currently detected location information) to the generative AI models 226. The generative AI models 226 analyze the wave fluctuations of the beach based on the location data (i.e. the input 304). The application 122 may trigger the imaging module of the user terminal 104*a* to capture the wave fluctuations of the beach in real time for the analysis process as explained above. Thereafter, the generative AI models 226 generate the control response including the set of control parameters or the auxiliary response related to the wave fluctuations. It is to be noted that the wave fluctuations may be a representative curve graph generated by generative AI models 226. Hence, the sexual stimulation device 112 is operated corresponding to the wave fluctuations on the beach.

Figure 3C:
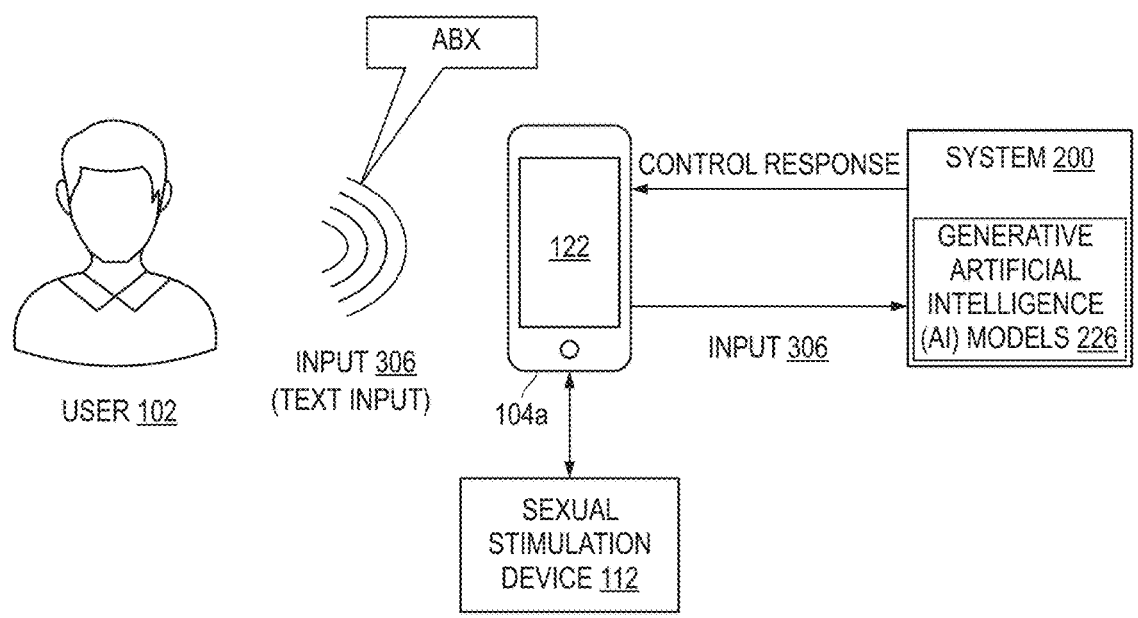

Referring to FIG. 3C in conjunction with FIG. 2, an example scenario of processing an input 306 including a single personalized interaction data (such as the text input) to generate the control response is illustrated. In this scenario, the generative AI models 226 generate the set of control parameters for the sexual stimulation device 112 corresponding to the text input (i.e. the personalized interaction data) provided in the application 122. The text input may be an exclusive name of an object entered by the user 102. The generative AI models 226 may be pre-configured to be trained to generate the set of control parameters based on the exclusive name of the object provided as input by the user 102. For example, the user 102 may provide the text input (exemplarily depicted to be "ABX") of the exclusive name of an adult toy (e.g., the sexual stimulation device 112) in the application 122. The user terminal 104a transmits the text input i.e. the input 306 of the exclusive name to the generative AI models 226. The generative AI models 226 analyze the user's text input to determine whether the exclusive name "ABX" corresponds to a certain adult toy that the user 102 currently wants to use or is using. The generative AI models 226 generates the set of control parameters for the sexual stimulation device 112 that the user 102 wants to use or is currently using based on the exclusive name entered by the user 102.

In one example, the user 102 wants to use an adult toy (i.e. the sexual stimulation device 112) and provides the exclusive name of the adult toy (i.e. the sexual stimulation device 112). The generative AI models 226 generate a wake-up command to wake up the adult toy (i.e. the sexual stimulation device 112). In another example, the user 102 is using an adult toy (i.e. the sexual stimulation device 112) and provides the exclusive name of the adult toy (i.e. the sexual stimulation device 112) while entering orgasm. The generative AI models 226 generate the set of control parameters that are suitable for the user's orgasmic state (such as increasing stimulation frequency) to meet their current usage needs. In an embodiment, the exclusive name of the object includes a digital person pre bound to the sexual stimulation device 112 of the user 102 or other opposite sex users pre bound to the sexual stimulation device 112 of the user 102.

Figure 3D:
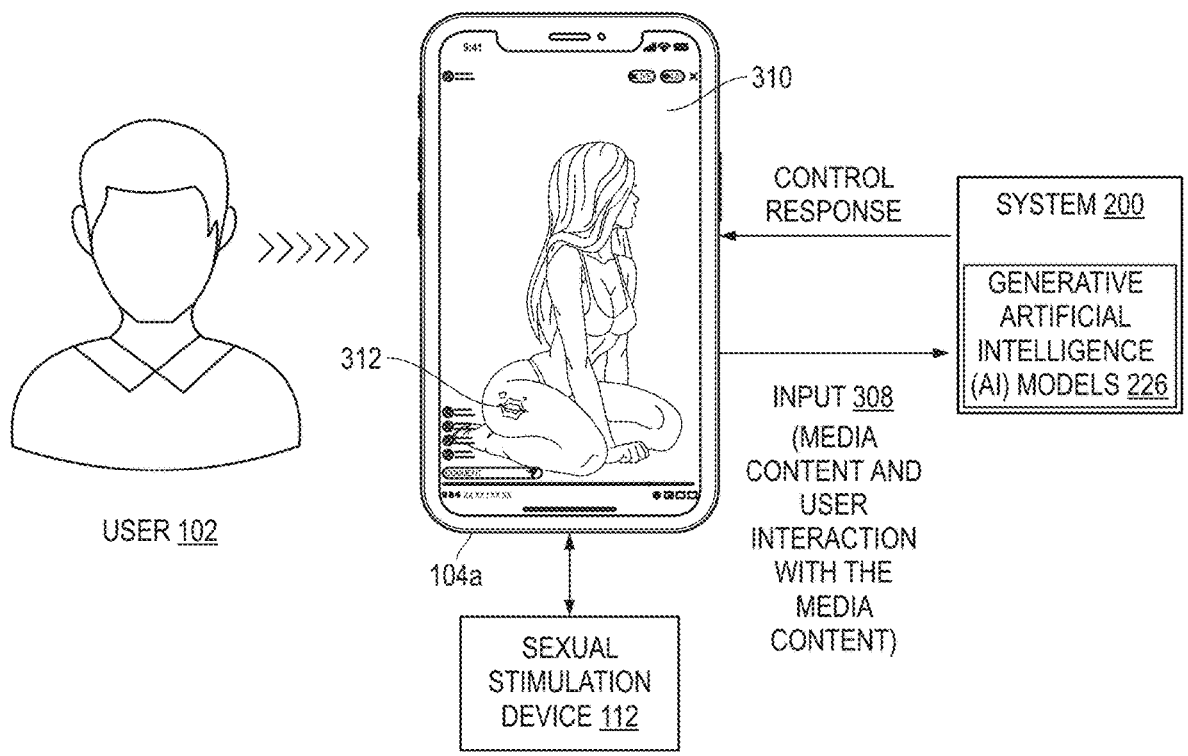

Referring to FIG. 3D in conjunction with FIG. 2, an example scenario of processing an input 308 including a single personalized interaction data (such as media content or user interaction with the media content) to generate the control response is illustrated. For illustration purposes, media content (see, 310 of FIG. 3D) including a sexually related live broadcast is rendered to the user 102 on the user terminal 104a and user interaction (see, 312 of FIG. 3D) with the media content 310 is depicted as posting a 'Kiss sticker' on the thighs of the model in the media content 310. The media content 310 may be generated by the media content generation module 222. Alternatively, the media content 310 may be provided by the third-party application servers 116. The generative AI models 226 generate the control response including the set of control parameters or the auxiliary response for the sexual stimulation device 112 based on the media content 310 or the user interaction 312 with the media content 310. In an example, the user 102 browses a hot female image on the user terminal 104a or the user terminal 104b (as shown in FIG. 3D). The application 122 monitors the user's activity in the user terminal 104a or 104c and transmits the personalized interaction data (such as the input 308) to the generative AI models 226. The generative AI models 226 analyze the female image (i.e. the media content 310) and predict that the user 102 is currently experiencing sexual impulses. The generative AI models 226 performs analysis of the female image based on the exposure of the female figure, chest size, and body proportion in the image, and combines the scene atmosphere of the image background (such as an indoor scene with a romantic atmosphere). As a result, the generative AI models 226 generate the set of control parameters for the sexual stimulation device 112 corresponding to the user's 102 feelings when browsing the female image. In this scenario, the sexual stimulation device 112 may provide a larger vibration amplitude and vibration frequency to provide the user 102 with stronger sexual stimulation to meet the strong sexual impulse generated by the user 102 when viewing the media content 310, thus meeting the direct or indirect usage needs of the user 102 in the current scene.

In another example, the application 122 monitors the data transmission between the user 102 and the sexual partner (e.g., the user 106a) of the user. The data transmission may include the user 102 chatting with the user 106a or the user 102 accessing the live broadcast of the user 106a, or the like. In this scenario, the application 122 with access to the chat may upload the chat records to the system 200. Further, the generative AI models 226 may generate corresponding adult content or the entertainment content (such as pornographic images, articles, videos, etc.) based on the chat records and transmits the adult content to the user terminal 104a for browsing and interaction as explained above. The user interaction with the entertainment content or the media content may include selecting content in the corresponding area such as a human body part in pornographic images or videos, a certain pornographic plot in pornographic novels, etc. The application 122 in the user terminal 104 transmits the user interaction results with adult content to the system 200. Based on the user's interaction, the generative AI models 226 generate the set of control parameters for the sexual stimulation device 112. For example, if the user 102 selects a highly intense sexual scene in a pornographic novel, the generated control parameters operate the sexual stimulation device 112 at high intensity, thereby meeting the user's current sexual masturbation needs.

Figure 3E:
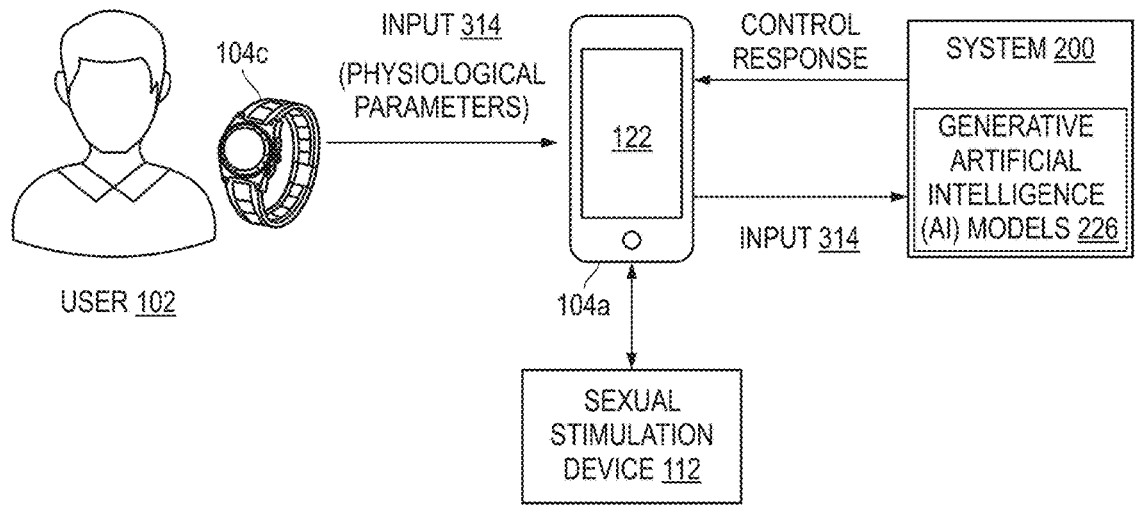

Referring to FIG. 3E in conjunction with FIG. 2, an example scenario of processing an input 314 including a single personalized interaction data (such as the physiological parameters) to generate the control response is illustrated. In an embodiment, the sexual stimulation device 112 may include physiological parameter detection sensors (such as heart rate monitoring sensors or blood pressure detection sensors, etc.). During the use of the sexual stimulation device 112, the physiological parameters (i.e., the input 314) detected by the physiological parameter detection sensors may be transmitted in real-time to the generative AI models 226 through the application 122 equipped in the user terminal 104a. The generative AI models 226 determine the user's 102 current level of excitement and the state of approaching orgasm based on the physiological parameters (i.e., the input 314). For example, when the user 102 is detected approaching orgasm (such as a significant increase in heart rate, high blood pressure, etc.), the generative AI models 226 immediately adjusts the set of control parameters of the sexual stimulation device 112, such as increasing vibration intensity or changing mode, to accurately push the user 102 to reach the orgasm. Further, during the user 102 recovery period, the generative AI models 226 may control the sexual stimulation device 112 to provide a soothing and restorative vibration mode to help the user 102 transition smoothly. This dynamic adjustment results in the response of the sexual stimulation device 112 being in line with the physiological parameters of the user 102. In one embodiment, the physiological parameters may be detected by using the user terminal 104c.

Figure 4A:
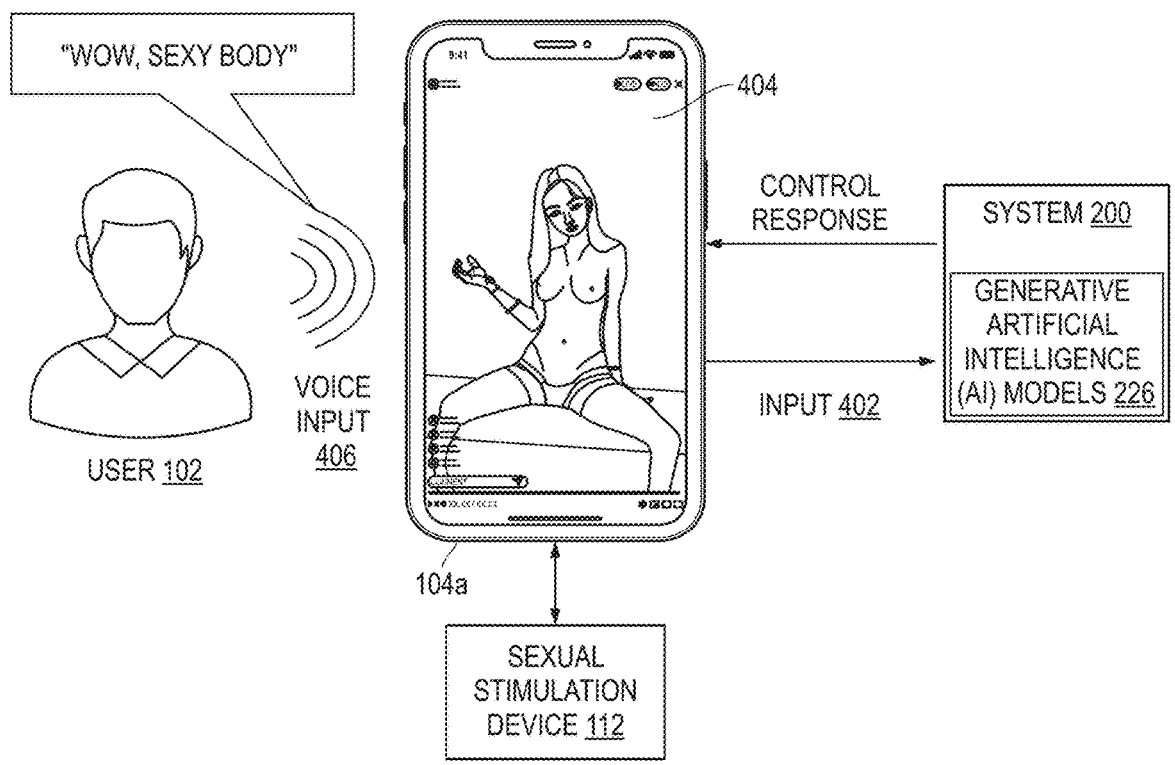
FIGS. 4A, 4B, and 4C illustrate example scenarios of processing input including at least personalized interaction data for generating the control response, in accordance with an embodiment of the present disclosure.

Referring to FIG. 4A in conjunction with FIG. 2, an example scenario of processing an input 402 including at least two interaction data (such as the user interaction with the media content and the voice input) to generate the control response is illustrated. As explained above, the generative AI models 226 fuse the user interaction with the media content and the voice input in a multimodal manner to form the input 402 and generate the set of control parameters for the sexual stimulation device 112. As shown in FIG. 4A, the user 102 browses an image (see, 404) of a beautiful woman on the user terminal 104a. The image corresponds to the media content. Alternatively, the user 102 may browse an e-book containing sexual content, a virtual girlfriend video for a digital person, adult video content containing sexual scenes, or multimedia content such as game videos. Further, the user 102 may emit a voice message 406 (i.e. the voice input) (exemplarily depicted to be "Wow, sexy body") when browsing the image of a beautiful woman (the user can also input relevant content in text). The interaction of the user 102 with the image 404 and the voice input 406 are fused to form the input 402. The generative AI models 226 analyze the voice input 406 to determine the sexual impulses of the user 102. At this time, the generative AI models 226 analyze the image 404 based on the user's input and this image. The generative AI models 226 generate the control response including the set of control parameters or the auxiliary response for operating the sexual stimulation device 112 corresponding to the input 402 including the at least two interaction data.

Figure 4B:
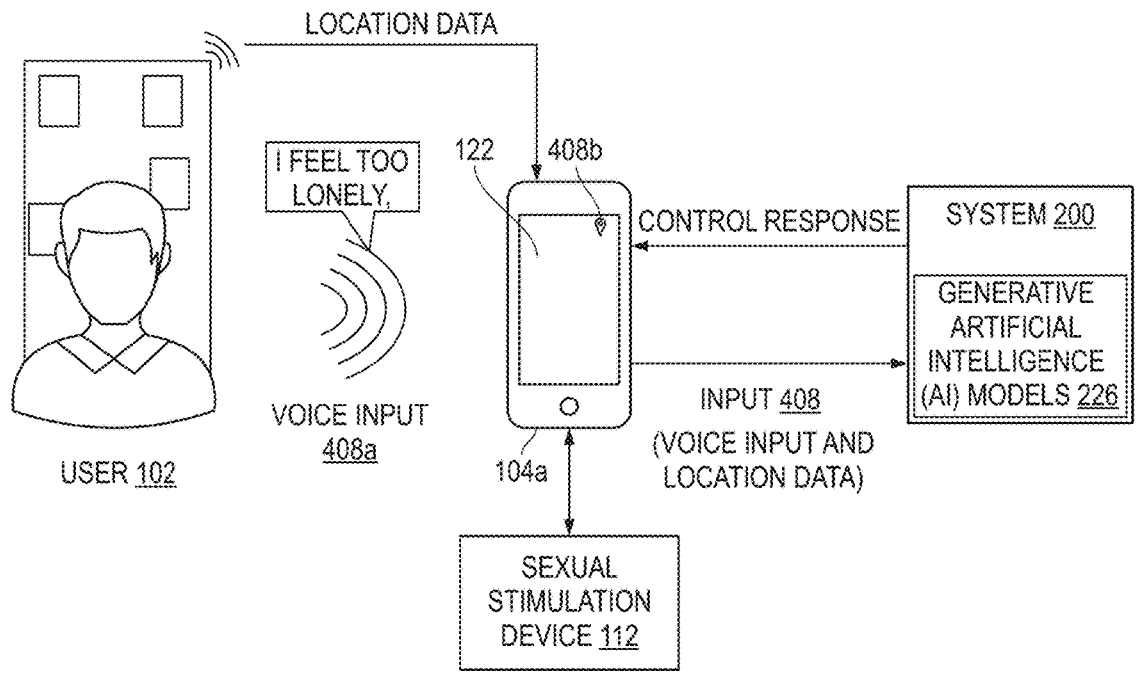

Referring to FIG. 4B in conjunction with FIG. 2, an example scenario of processing an input 408 including at least two interaction data (such as the voice input and the location data) to generate the control response is illustrated. As explained above, the generative AI models 226 fuse a segment of the voice input (or the text input) with the location data (such as positioning, acceleration, working parameters, etc.) of the user terminal 104*a* to form the input 408 in a multimodal manner to generate the set of control parameters for the sexual stimulation device 112. In an example, the user 102 is in a hotel and the user 102 provides a voice input 408*a* (exemplarily depicted as "I feel too lonely"). In this example scenario, the generative AI models 226 analyze the voice input 408*a* to determine the sexual impulse of the user 102. Further, the generative AI models 226 obtain location data 408*b* of the user terminal 104*a* and determines that the current sexual stimulation device usage scenario of the user 102 is a hotel based on the location data 408*b*. Thereafter, the generative AI models 226 generate the control response including the set of control parameters or the auxiliary response corresponding to the input 408 including the voice input 408*a* and the location data 408*b*.

Figure 4C:
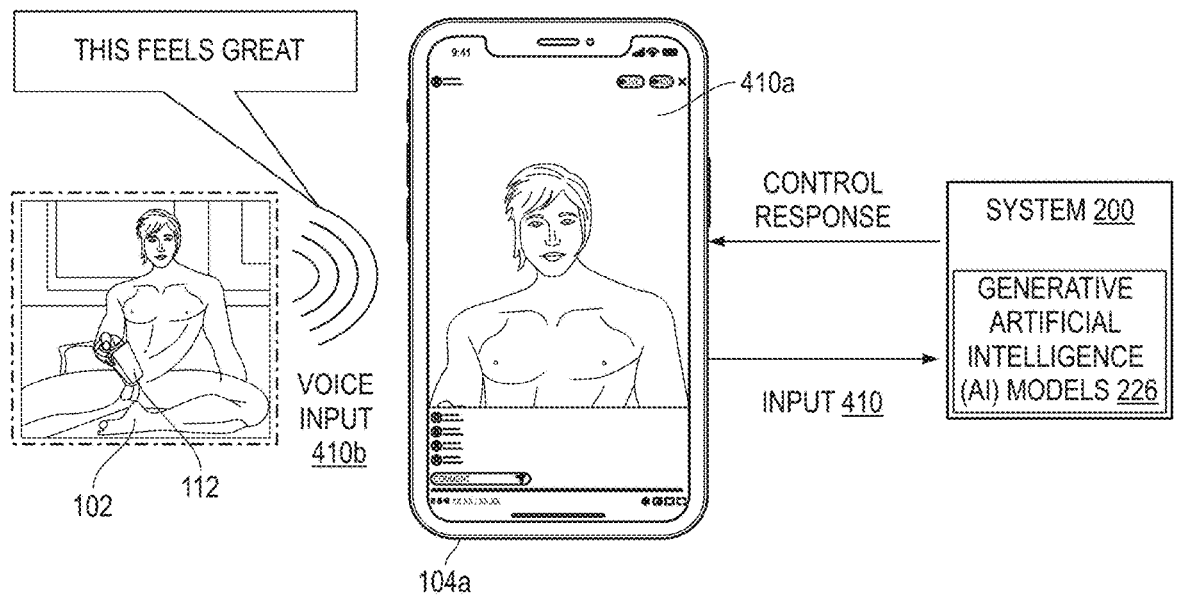

Referring to FIG. 4C in conjunction with FIG. 2, an example scenario of processing an input 410 including two types of inputs (such as the voice input and the facial expression of the user 102) to generate the control response is illustrated. As explained above, the generative AI models 226 fuse a segment of the voice input (or the text input) with the facial expression of the user 102 to form the input 408 in a multimodal manner to generate the set of control parameters for the sexual stimulation device 112. As shown in FIG. 4C, the user 102 may use the sexual stimulation device 112 to experience the sexual pleasure. In this scenario, the imaging module of the user terminal 104*a* may be activated to capture facial expressions (see, 410*a*) of the user 102 and the user 102 may provide a voice input (see, 410*b*) (exemplarily depicted as "This feels great"). The application 122 transmits the input 410 including the voice input 410*b* and the facial expressions 410*a* to the generative AI models 226. The generative AI models 226 analyze the input 410 including the voice input 410*b* and the facial expressions 410*a* to determine the sexual needs of the user 102. Thereafter, the generative AI models 226 generate the control response including the set of control parameters or the auxiliary response corresponding to the input 410 including the voice input 410*b* and the facial expressions 410*a*.

In another example, when the user 102 watches an adult video, the user 102 sends a voice-prompted message (i.e., the voice input) to the user terminal 104, For example, the voice input may include "I like this scene and have the adult toy mimic it.". The generative AI models 226 receives the voice input and accesses the video content (e.g., pornographic video) that the user 102 is watching. The generative AI models 226 analyzes the movements or rhythms of the sexual behaviors of the characters in the video content and performs multimodal fusion by combining the positive emotions in the voice input of the user 102 and the explicit imitation needs (e.g., tone of voice, the keywords "like" and "imitate"). The generative AI models 226 generates the set of control parameters to operate the sexual stimulation device 112 corresponding to the action patterns of the characters in the video content. The set of control parameters may enable adjusting vibration patterns to match the frequency and intensity of sexual behavior of the characters in the video content. In addition, if there are specific music or environmental sound effects in the video content (e.g., the sound of spanking or gasping), the generative AI models 226 may generate the corresponding set of control parameters to synchronize the audio output of the video content. This results in the creation of an auditory ambiance that matches the sex scene of the video content, thereby enhancing the user's immersion in watching the video content and using the sexual stimulation device 112.

In one example, the user terminal 104*c* may detect the physiological parameters (such as heart rate, respiratory rate, or blood pressure) of the user 102 while the user 102 is experiencing the sexual pleasure by operating the sexual stimulation device 112. In this scenario, the user 102 may further provide a voice input "I want to play longer". The generative AI models 226 analyze the input including the voice input and the physiological parameters to determine the current sexual needs (e.g., the user 102 wants to arrive at the climax state later). The generative AI models 226 generates the control response including the set of control parameters or the auxiliary response corresponding to the input including the at least two interaction data (such as the voice input and the physiological parameters). In this scenario, the set of control parameters may operate the sexual stimulation device 112 (for example, the vibration amplitude and vibration frequency are reduced) to delay the arrival of the orgasm of the user 102.

In an example, the user 102 may view the live performance of the model using the user terminal 104 and provide tokens to the model of the live performance. In this scenario, the corresponding token parameters may be determined based on relevant user input data and/or other personalized interaction data. The user input data may include the voice input, facial expressions, heart rate, or body movements. The other personalized interaction data may include environmental parameters (such as thrusting sounds generated by the user 102 using the sexual stimulation device 112) or objects around the user 102 (such as the sexual stimulation device 112 used by the user 102, other objects pointed by the user 102, an object spoken by the user 102, or other objects held by the user 102). For example, when the user 102 may provide the tokens to the model by providing the personalized interaction data such as holding a cup of coffee and a voice command to "provide tokens" or "provide tokens corresponding to coffee in my hand". In this scenario, the user terminal 104 may be used to capture an image of the user 102 holding the coffee in their hand and receive the voice commands. Further, the system 200 or the application 122 on the user terminal 104 determines the type of coffee in the user's 102 hand through image analysis. Additionally, the system 200 may obtain the price or price range of the type of coffee (for example, from the Internet). Further, the model is provided with the tokens corresponding to the price range of the type of coffee in the cup held by the user 102.

In another example, the user 102 may watch a live performance of a model using the user terminal 104. Further, when the user 102 needs to provide the tokens to the model, generative AI models (such as the generative AI models 226) are used to generate corresponding token parameters based on the relevant user input data and/or other personalized interaction data. For example, when the user 102 needs to provide the tokens to the model, the user 102 issues a voice command to "provide tokens". To that effect, the generative AI models 226 analyzes the emotions based on the voice input and determines the number of tokens to be provided to the model.

Figure 5:
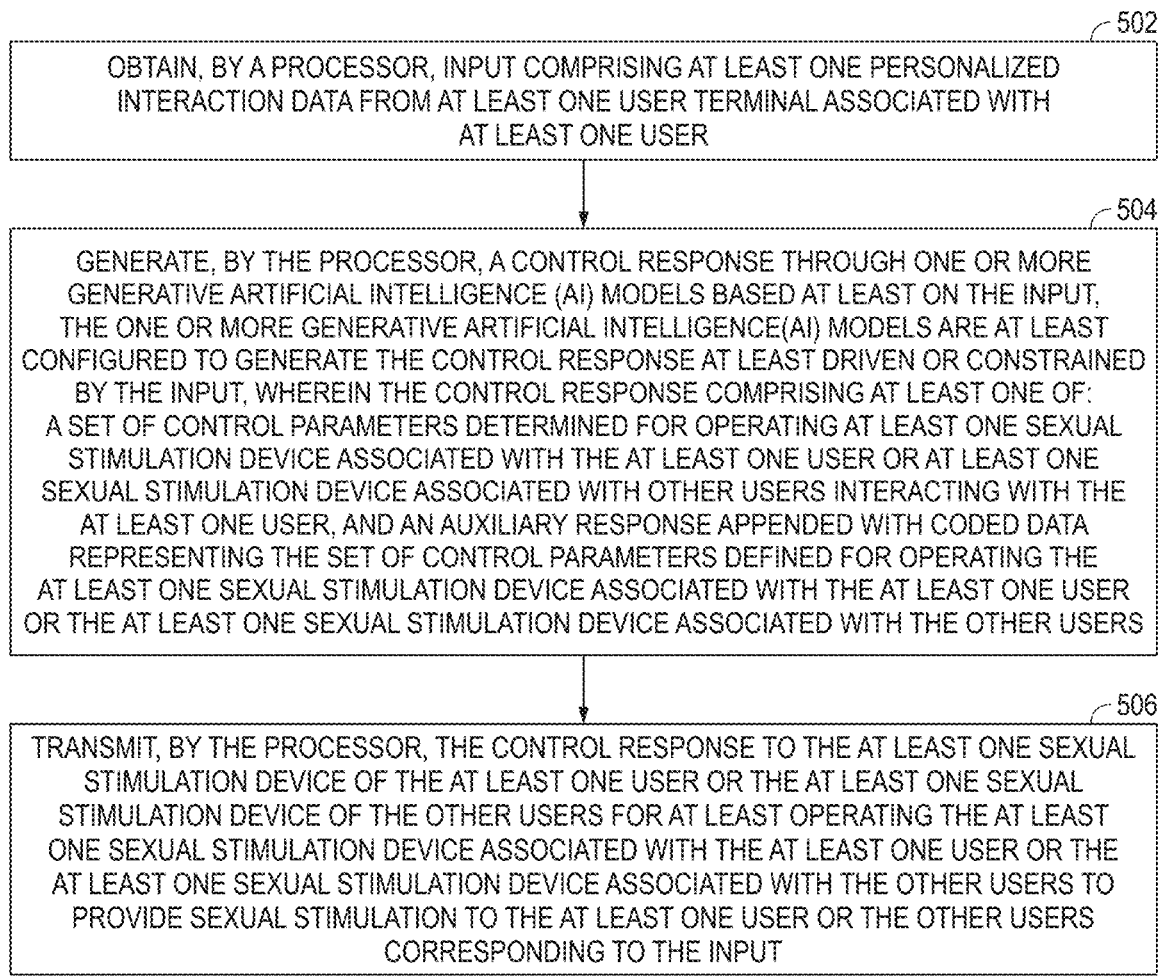
FIG. 5 illustrates a flow diagram of a computer-implemented method for generating the control response to operate the sexual stimulation device, in accordance with an embodiment of the present disclosure.

FIG. 5 illustrates a flow diagram of a computer-implemented method 500 for generating a control response to operate a sexual stimulation device, in accordance with an embodiment of the present disclosure. The method 500 depicted in the flow diagram may be executed by, for example, the system 200 or the system 110. Operations of the flow diagram of the method 500, and combinations of the operations in the flow diagram of the method 500, may be implemented by, for example, hardware, firmware, a processor, circuitry, and/or a different device associated with the execution of software that includes one or more computer program instructions. It is noted that the operations of the method 500 can be described and/or practiced by using a system 200. The method 500 starts at operation 502.

At operation 502, the method 500 includes obtaining, by the processor 206, input including at least one personalized interaction data from the at least one user terminal 104 associated with the user 102.

At operation 504, the method 500 includes generating, by the processor 206, the control response through the one or more generative artificial intelligence (AI) models 226/114 based at least on the input. In one scenario, the control response includes the set of control parameters determined for operating at least one sexual stimulation device 112 associated with the at least one user 102 or the at least one sexual stimulation device 124 associated with the other users 106a-106c interacting with the at least one user 102. In another scenario, the control response includes the auxiliary response appended with the coded data representing the set of control parameters defined for operating the at least one sexual stimulation device 112 associated with the at least one user 102 or the at least one sexual stimulation device 124 associated with the other users 106a-106c.

At operation 506, the method 500 includes transmitting, by the processor 206, the control response to the at least one sexual stimulation device 112 of the at least one user 102 or the at least one sexual stimulation device 124 of the other users 106a-106c for at least operating the at least one sexual stimulation device 112 associated with the at least one user 102 or the at least one sexual stimulation device 124 associated with the other users 106a-106c to provide sexual stimulation to the at least one user 102 or the other users 106a-106c corresponding to the input. The one or more operations performed by the processor 206 or the system 200 to generate the control parameters for operating the sexual stimulation device 112 and provide sexual stimulation are explained with references to FIG. 1 to FIGS. 4A and 4C, therefore they are not reiterated herein for the sake of brevity.

Figure 6:
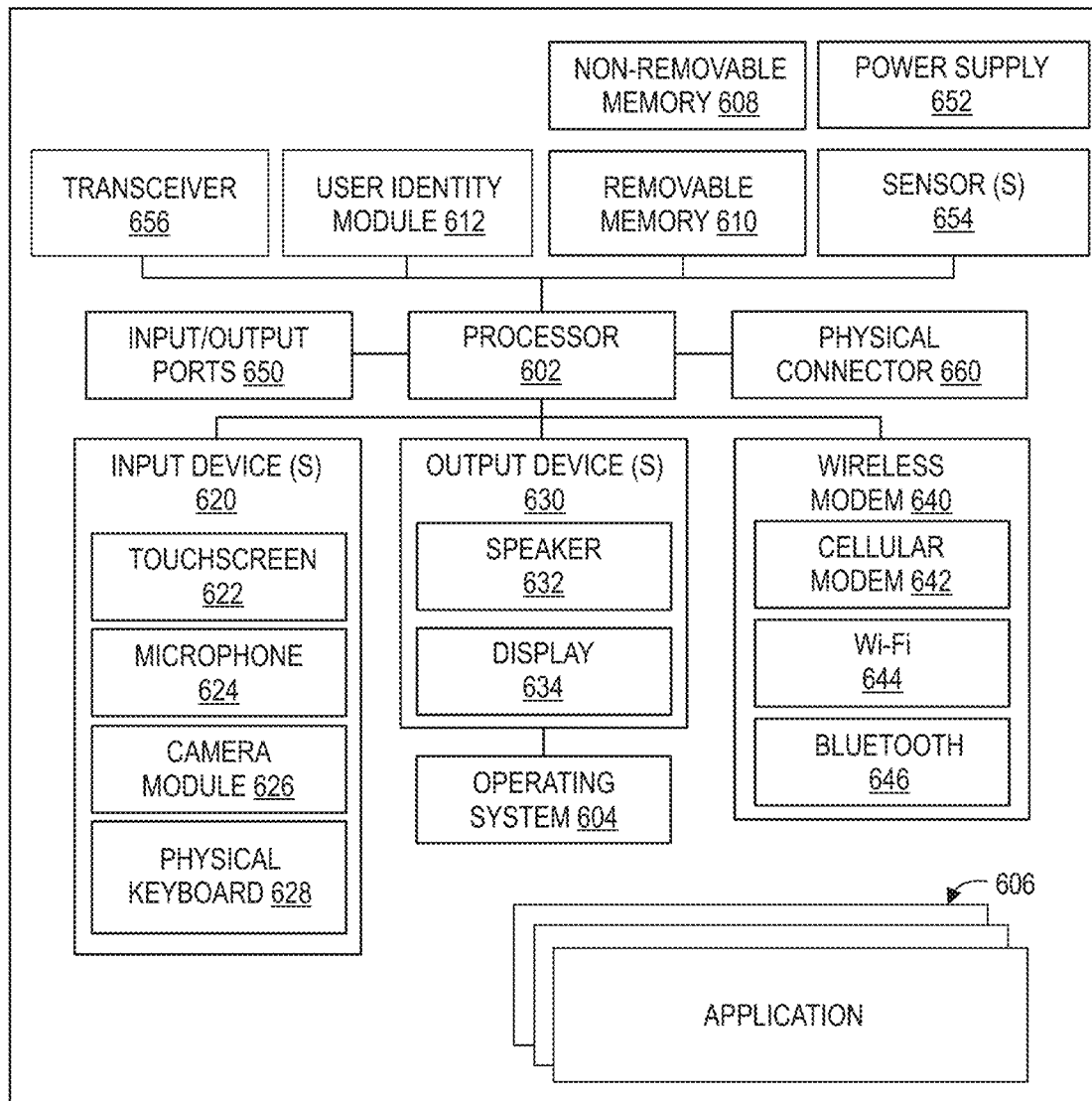
FIG. 6 is a simplified block diagram of an electronic device capable of implementing various embodiments of the present disclosure.

FIG. 6 is a simplified block diagram of an electronic device 600 capable of implementing various embodiments of the present disclosure. For example, the electronic device 600 may correspond to the user terminal 104 and the user devices 108a-108c of FIG. 1. The electronic device 600 is depicted to include one or more applications 606. One of the one or more applications 606 installed on the electronic device 600 is capable of communicating with a system (i.e., the system 200 or the system 110) for performing one or more operations related to generating the control parameters for operating the sexual stimulation device 112 and providing sexual stimulation as explained above.

It should be understood that the electronic device 600 as illustrated and hereinafter described is merely illustrative of one type of device and should not be taken to limit the scope of the embodiments. As such, it should be appreciated that at least some of the components described below in connection with the electronic device 600 may be optional and thus in an embodiment may include more, fewer, or different components than those described in connection with the embodiment of the FIG. 6. As such, among other examples, the electronic device 600 could be any of a mobile electronic device, for example, cellular phones, tablet computers, laptops, mobile computers, personal digital assistants (PDAs), mobile televisions, MR headset device, mobile digital assistants, or any combination of the aforementioned, and other types of communication or multimedia devices.

The illustrated electronic device 600 includes a controller or a processor 602 (e.g., a signal processor, microprocessor, ASIC, or other control and processing logic circuitry) for performing such tasks as signal coding, data processing, image processing, input/output processing, power control, and/or other functions. An operating system 604 controls the allocation and usage of the components of the electronic device 600 and supports one or more operations of the application (see, the applications 606) that implements one or more of the innovative features described herein. In addition, the applications 606 may include common mobile computing applications (e.g., telephony applications, email applications, calendars, contact managers, web browsers, messaging applications) or any other computing application.

The illustrated electronic device 600 includes one or more memory components, for example, a non-removable memory 608 and/or removable memory 610. The non-removable memory 608 and/or the removable memory 610 may be collectively known as a database in an embodiment. The non-removable memory 608 can include RAM, ROM, flash memory, a hard disk, or other well-known memory storage technologies. The removable memory 610 can include flash memory, smart cards, or a Subscriber Identity Module (SIM). The one or more memory components can be used for storing data and/or code for running the operating system 604 and the applications 606. The electronic device 600 may further include a user identity module (UIM) 612. The UIM 612 may be a memory device having a processor built in. The UIM 612 may include, for example, a subscriber identity module (SIM), a universal integrated circuit card (UICC), a universal subscriber identity module (USIM), a removable user identity module (R-UIM), or any other smart card. The UIM 612 typically stores information elements related to a mobile subscriber. The UIM 612 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 600 can support one or more input devices 620 and one or more output devices 630. Examples of the input devices 620 may include, but are not limited to, a touch screen/a display screen 622 (e.g., capable of capturing finger tap inputs, finger gesture inputs, multi-finger tap inputs, multi-finger gesture inputs, or keystroke inputs from a virtual keyboard or keypad), a microphone 624 (e.g., capable of capturing voice input), a camera module 626 (e.g., capable of capturing still picture images and/or video images) and a physical keyboard 628. Examples of the output devices 630 may include, but are not limited to, a speaker 632 and a display 634. Other possible output devices can include piezoelectric or other haptic output devices. Some devices can serve more than one input/output function. For example, the touchscreen 632 and the display 634 can be combined into a single input/output device.

A wireless modem 640 can be coupled to one or more antennas (not shown in FIG. 6) and can support two-way communications between the processor 602 and external devices, as is well understood in the art. The wireless modem 640 is shown generically and can include, for example, a cellular modem 642 for communicating at long range with the mobile communication network, a Wi-Fi compatible modem 644 for communicating at short range with an external Bluetooth-equipped device, or a local wireless data network or router, and/or a Bluetooth-compatible modem 646. The wireless modem 640 is typically configured for communication with one or more cellular networks, such as a GSM network for data and voice communications within a single cellular network, between cellular networks, or between the electronic device 600 and a public switched telephone network (PSTN).

The electronic device 600 can further include one or more input/output ports 650, a power supply 652, one or more sensors 654 for example, an accelerometer, a gyroscope, a compass, or an infrared proximity sensor for detecting the orientation or motion of the electronic device 600 and biometric sensors for scanning biometric identity of an authorized user, a transceiver 656 (for wirelessly transmitting analog or digital signals) and/or a physical connector 660, which can be a USB port, IEEE 1294 (FireWire) port, and/or RS-232 port. The illustrated components are not required or all-inclusive, as any of the components shown can be deleted and other components can be added.

The disclosed method with reference to FIG. 5, or one or more operations of the system 110 or the system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the systems 110/200/700 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media includes any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system comprising:
a memory storing executable instructions; and
a processor operatively coupled with the memory, the processor being configured to execute the executable instructions to cause the system to at least:
obtain an input including at least one item of personalized interaction data from at least one user terminal associated with at least one user:
generate a control response through one or more generative artificial intelligence (AI) models based at least on the input, the one or more generative artificial intelligence (AI) models being at least configured to generate the control response at least driven or constrained by the input, and the control response comprising at least one of (i) a set of control parameters determined for operating at least one sexual stimulation device associated with the at least one user or at least one sexual stimulation device associated with other users interacting with the at least one user, and (ii) an auxiliary response appended with coded data representing the set of control parameters defined for operating the at least one sexual stimulation device associated with the at least one user or the at least one sexual stimulation device associated with the other users; and
transmit the control response to the at least one sexual stimulation device of the at least one user or the at least one sexual stimulation device of the other users for at least operating the at least one sexual stimulation device associated with the at least one user or the at least one sexual stimulation device associated with the other users to provide sexual stimulation corresponding to the input to the at least one user or the other users,
wherein the input comprises (i) a single personalized interaction data, and the processor is further configured, at least in part, to generate a first set of feature vectors corresponding to the input based at least on extracting a set of attributes from the input, and generate the control response corresponding to the input through the one or more generative artificial intelligence (AI) models at least driven or constrained by the first set of feature vectors, or (ii) at least two items of personalized interaction data, and the processor is further configured, at least in part, to generate a second set of feature vectors corresponding to the input based at least on extracting a set of attributes from the input comprising the at least two personalized data, and generate the control response corresponding to the input through the one or more generative artificial intelligence (AI) models at least driven or constrained by the second set of feature vectors.

2. The system as claimed in claim 1, wherein the at least one item of personalized interaction data comprises at least:
user input data comprising a voice input, a text input, location data of the at least one user terminal of the at least one user, and personal information of the user and the other users;
user interaction with the content, the user interaction comprising at least the voice input, the text input, and facial expressions of the user;
ambient parameters of the user;
physiological parameters of the user;
control mode creation corresponding to the set of control parameters; and
data transmission between the user and the other users.

3. The system as claimed in claim 1, wherein:
the control response further comprises at least text content, image content, video content, and audio content applicable to the operation of the sexual stimulation device,
at least the text content, the image content, the video content, and the audio content to be appended to the control response are generated based on the set of control parameters, and
at least the text content, the image content, the video content, and the audio content are rendered on the at least one user terminal of the at least one user while the sexual stimulation device is operating based on the set of control parameters.

4. The system as claimed in claim 1, wherein the processor is further configured, at least in part, to:
generate media content comprising at least text data, image data, video data, game content, live broadcast, and audio data;
transmit the media content to the at least one user terminal of the at least one user; and
obtain the input comprising the at least one item of personalized interaction data based at least on one of the media content and a user interaction of the user with respect to the media content.

5. The system as claimed in claim 1, wherein the processor is further configured, at least in part, to:
compute a matching score based at least on mapping each feature vector of the set of feature vectors with a predefined control parameters list stored in a database associated with the one or more generative artificial intelligence (AI) models, the set of control parameters being determined from the predefined control parameters list stored in the database, and the set of control parameters being determined based on a feature vector among the set of feature vectors whose matching score is greater than a threshold score; and
generate the control response based on the set of control parameters for operating the at least one sexual stimulation device of the at least one user or the at least one sexual stimulation device of the other users.

6. The system as claimed in claim 1, wherein the processor is further configured, at least in part, to:
predict a subsequent action of the user based on the personalized interaction data of the user by implementing the one or more generative artificial intelligence (AI) models, the subsequent action of the user comprising a sexual arousal state of the user; and
generate the control response corresponding to the predicted subsequent action of the user through the one or more generative artificial intelligence (AI) models.

7. The system as claimed in claim 1, wherein the processor is further configured, at least in part, to:

monitor an operating state of the sexual stimulation device operating based on the set of control parameters; and dynamically adjust the set of control parameters for adjusting the operating state of the sexual stimulation device based at least on the one or more generative artificial intelligence (AI) models.

8. The system as claimed in claim 7, wherein:

the at least one item of personalized interaction data includes at least one of equipment information of the sexual stimulation device, operating settings of the sexual stimulation device defined by the user, and physiological parameters of the user, and the processor is further configured, at least in part, to dynamically adjust the set of control parameters for adjusting the operating state of the sexual stimulation device corresponding to the at least one item of personalized interaction data including the at least one of the equipment information of the sexual stimulation device, the operating settings of the sexual stimulation device defined by the user, and the physiological parameters of the user, the set of control parameters being adjusted based at least on the one or more generative artificial intelligence (AI) models.

9. The system as claimed in claim 1, wherein:

the at least one item of personalized interaction data is directly or indirectly related to personalized sexual entertainment needs of the at least one user; and the one or more generative artificial intelligence (AI) models is at least configured to generate the control response corresponding to the personalized sexual entertainment needs of the at least one user.

10. The system as claimed in claim 9, wherein the processor is further configured, at least in part, to:

determine the personalized sexual entertainment needs of the at least one user through the one or more generative artificial intelligence (AI) models based on the input; and generate the control response at least driven or constrained by the personalized sexual entertainment needs of the at least one user through the one or more generative artificial intelligence (AI) models.

11. A computer-implemented method, comprising:

obtaining, by a processor, an input comprising at least one item of personalized interaction data from at least one user terminal associated with at least one user;

generating, by the processor, a control response through one or more generative artificial intelligence (AI) models based at least on the input, the one or more generative artificial intelligence (AI) models being at least configured to generate the control response at least driven or constrained by the input, and the control response comprising at least one of (i) a set of control parameters determined for operating at least one sexual stimulation device associated with the at least one user or at least one sexual stimulation device associated with other users interacting with the at least one user, and (ii) an auxiliary response appended with coded data representing the set of control parameters defined for operating the at least one sexual stimulation device associated with the at least one user or the at least one sexual stimulation device associated with the other users; and transmitting, by the processor, the control response to the at least one sexual stimulation device of the at least one user or the at least one sexual stimulation device of the other users for at least operating the at least one sexual stimulation device associated with the at least one user or the at least one sexual stimulation device associated with the other users to provide sexual stimulation corresponding to the input to the at least one user or the other users, wherein the at least one item of personalized interaction data comprises at least:

user input data comprising a voice input, a text input, location data of the at least one user terminal of the at least one user, and personal information of the user and the other users;

user interaction with the content, the user interaction comprising at least the voice input, the text input, and facial expressions of the user;

ambient parameters of the user;

physiological parameters of the user;

control mode creation corresponding to the set of control parameters; and data transmission between the user and the other users.

12. The computer-implemented method as claimed in claim 11, further comprising:

obtaining, by the processor, the input comprising a single item of personalized interaction data;

generating, by the processor, a first set of feature vectors corresponding to the input based at least on extracting a set of attributes from the input; and generating, by the processor, the control response corresponding to the input through the one or more generative artificial intelligence (AI) models at least driven or constrained by the first set of feature vectors.

13. The computer-implemented method as claimed in claim 11, further comprising:

obtaining, by the processor, the input comprising at least two items of personalized interaction data;

generating, by the processor, a second set of feature vectors corresponding to the input based at least on extracting a set of attributes from the input comprising the at least two items of personalized data; and generating, by the processor, the control response corresponding to the input through the one or more generative artificial intelligence (AI) models at least driven or constrained by the second set of feature vectors.

14. The computer-implemented method as claimed in claim 11, wherein:

the control response further comprises at least text content, image content, video content, and audio content applicable to the operation of the sexual stimulation device, at least the text content, the image content, the video content, and the audio content to be appended to the control response are generated based on the set of control parameters, and at least the text content, the image content, the video content, and the audio content are rendered on the at least one user terminal of the at least one user while the sexual stimulation device is operating based on the set of control parameters.

15. The computer-implemented method as claimed in claim 11, further comprising:

generating, by the processor, media content comprising at least text data, image data, video data, game content, live broadcast, and audio data;

transmitting, by the processor, the media content to the at least one user terminal of the at least one user; and obtaining, by the processor, the input comprising the at least one item of personalized interaction data based at least on one of the media content and a user interaction of the user with respect to the media content.

16. The computer-implemented method as claimed in claim 11, further comprising:

determining, by the processor, personalized sexual entertainment needs of the at least one user through the one or more generative artificial intelligence (AI) models based on the input comprising the at least one item of personalized interaction data corresponding to the personalized sexual entertainment needs of the at least one user; and generating, by the processor, the control response at least driven or constrained by the personalized sexual entertainment needs of the at least one user through the one or more generative artificial intelligence (AI) models to match the personalized sexual entertainment needs of the at least one user.

17. A non-transitory computer-readable storage medium storing machine-readable instructions, the machine-readable instructions, when executed by a processor of a system, enabling the system to:

obtain an input comprising at least one item of personalized interaction data from at least one user terminal associated with at least one user;

generate a control response through one or more generative artificial intelligence (AI) models based at least on the input, the one or more generative artificial intelligence (AI) models being at least configured to generate the control response at least driven or constrained by the input, and the control response comprising at least one of (i) a set of control parameters determined for operating at least one sexual stimulation device associated with the at least one user or at least one sexual stimulation device associated with other users interacting with the at least one user, and (ii) an auxiliary response appended with coded data representing the set of control parameters defined for operating the at least one sexual stimulation device associated with the at least one user or the at least one sexual stimulation device associated with the other users; and transmit the control response to the at least one sexual stimulation device of the at least one user or the at least one sexual stimulation device of the other users for at least operating the at least one sexual stimulation device associated with the at least one user or the at least one sexual stimulation device associated with the other users to provide sexual stimulation corresponding to the input to the at least one user or the other users, wherein the machine-readable instructions, when executed by the processor of the system, further enable the system to predict a subsequent action of the user based on the personalized interaction data of the user by implementing the one or more generative artificial intelligence (AI) models, the subsequent action of the user comprising a sexual arousal state of the user, and generate the control response corresponding to the predicted subsequent action of the user through the one or more generative artificial intelligence (AI) models.

\* \* \* \* \*